US011035340B2

United States Patent
Church

(10) Patent No.: US 11,035,340 B2
(45) Date of Patent: Jun. 15, 2021

(54) FLUIDIC TURBINE STRUCTURE

(71) Applicant: BIOMERENEWABLES INC., Toronto (CA)

(72) Inventor: Ryan Church, Toronto (CA)

(73) Assignee: BIOMERENEWABLES INC., Toronto (CA)

(*) Notice: Subject to any disclaimer, the term of this patent is extended or adjusted under 35 U.S.C. 154(b) by 106 days.

(21) Appl. No.: 16/121,326

(22) Filed: Sep. 4, 2018

(65) Prior Publication Data

US 2018/0372069 A1    Dec. 27, 2018

Related U.S. Application Data

(63) Continuation-in-part of application No. 15/501,475, filed as application No. PCT/CA2015/050739 on Aug. 5, 2015, now Pat. No. 10,578,076.

(Continued)

(51) Int. Cl.
*F03D 1/06* (2006.01)
*F03D 17/00* (2016.01)
(Continued)

(52) U.S. Cl.
CPC .......... *F03D 1/0691* (2013.01); *F03B 13/264* (2013.01); *F03B 17/061* (2013.01);
(Continued)

(58) Field of Classification Search
CPC . F03D 7/04; F03D 7/042; F03D 7/045; F03D 7/074; F03D 7/048; F03D 1/06; F03D 1/0608
See application file for complete search history.

(56) References Cited

U.S. PATENT DOCUMENTS 2,472,357 A    6/1949  Wolf
3,941,504 A    3/1976  Snarbach
(Continued)

FOREIGN PATENT DOCUMENTS

CN    101550902 A    10/2009
CN    101616839 A    12/2009
(Continued)

OTHER PUBLICATIONS

Chinese Office Action dated Mar. 12, 2019 issued in Chinese Application No. 201580042006.8.
(Continued)

*Primary Examiner* — Woody A Lee, Jr.
*Assistant Examiner* — Maxime M Adjagbe
(74) *Attorney, Agent, or Firm* — Norton Rose Fulbright Canada LLP

(57) ABSTRACT

A fluidic structure configured to be mounted onto the hub of a fluidic turbine comprising a hub that rotates about a center axis, aligned to a main shaft that contributes torque to the main shaft of the turbine via the principle of lift and/or drag. The fluidic structure can be rigid or have some flexibility. The structure has two or more curved fluidic elements that extend from an upstream tip that aligns to the center axis of rotation, to a downstream end at some further radial position away from the center axis, and rotates about the center axis, wherein the two or more curved fluidic elements contain chord sections that are generally more wide at the upstream position and general more narrow at the downstream position.

18 Claims, 29 Drawing Sheets

Related U.S. Application Data

(60) Provisional application No. 62/033,331, filed on Aug. 5, 2014.

(51) Int. Cl.
   | | | |
   |---|---|---|
   | *F03D 7/02* | (2006.01) | |
   | *F03D 13/10* | (2016.01) | |
   | *F03D 13/40* | (2016.01) | |
   | *F03B 17/06* | (2006.01) | |
   | *F03B 13/26* | (2006.01) | |
   | *F03D 7/04* | (2006.01) | |

(52) U.S. Cl.
   CPC ......... *F03D 1/0608* (2013.01); *F03D 7/0224* (2013.01); *F03D 7/043* (2013.01); *F03D 13/10* (2016.05); *F03D 13/40* (2016.05); *F03D 17/00* (2016.05); *F03D 7/047* (2013.01); *F05B 2230/60* (2013.01); *F05B 2240/14* (2013.01); *F05B 2240/921* (2013.01); *F05B 2250/15* (2013.01); *F05B 2250/16* (2013.01); *F05B 2250/232* (2013.01); *F05B 2260/80* (2013.01); *F05B 2260/96* (2013.01); *F05B 2270/32* (2013.01); *F05B 2270/331* (2013.01); *F05B 2270/8042* (2013.01)

(56) References Cited

U.S. PATENT DOCUMENTS

| | | | |
|---|---|---|---|
| 4,368,007 A | 1/1983 | Ely | |
| 7,342,323 B2 * | 3/2008 | Avagliano | F03D 7/0224 290/55 |
| 7,944,070 B2 | 5/2011 | Rosenvard et al. | |
| 8,287,243 B2 | 10/2012 | Herr et al. | |
| 8,308,437 B2 | 11/2012 | Bagepalli et al. | |
| 8,899,920 B2 | 12/2014 | Anderson | |
| 8,985,947 B2 | 3/2015 | Obrecht et al. | |
| 9,200,614 B2 | 12/2015 | Godsk | |
| 2010/0008780 A1 | 1/2010 | Miocevich | |
| 2010/0140940 A1 * | 6/2010 | Kammer | F03D 7/043 290/44 |
| 2011/0018268 A1 | 1/2011 | Snel et al. | |
| 2011/0027087 A1 | 2/2011 | Rhys et al. | |
| 2011/0085907 A1 | 4/2011 | Anderson | |
| 2011/0176920 A1 | 7/2011 | Zhang | |
| 2011/0311363 A1 | 12/2011 | Bills et al. | |
| 2012/0051916 A1 | 3/2012 | Bagepalli et al. | |
| 2012/0060684 A1 * | 3/2012 | Lavender | F04B 17/02 92/12.1 |
| 2012/0128475 A1 | 5/2012 | Bailey | |
| 2013/0121841 A1 * | 5/2013 | Obrecht | F03D 1/0691 416/245 R |
| 2013/0224039 A1 | 8/2013 | Moser | |
| 2013/0251524 A1 * | 9/2013 | Grigg | F03D 9/25 416/9 |
| 2016/0040650 A1 | 2/2016 | Opaits et al. | |
| 2016/0311519 A1 | 10/2016 | Lopez et al. | |

FOREIGN PATENT DOCUMENTS

| | | |
|---|---|---|
| CN | 102575641 A | 7/2012 |
| EP | 2048507 A2 | 4/2009 |
| EP | 2592265 A2 | 5/2013 |
| GB | 2369161 A | 5/2002 |
| TW | 201210895 A | 3/2012 |
| WO | 2002002935 A1 | 1/2002 |
| WO | 2009018666 A1 | 2/2009 |
| WO | 2011160061 A3 | 3/2012 |
| WO | 2016019466 A1 | 2/2016 |

OTHER PUBLICATIONS

International Preliminary Report on Patentability issued in International Application No. PCT/CA2019/051232 dated Dec. 10, 2019.
Church, R. et al., "Putting the Nosecone to Work: Innovations in the Design of a Power-Producing Spinner", EWEA Annual Conference, Jan. 1, 2016, Hamburg, Germany, p. 1-3, https://windeurope.org/summit2016/conference/submit-an-abstract/pdf/664885160596.pdf.
BRPTO, Office Action for Brazilian Patent Application No. 112017002317-2 dated Jul. 30, 2020.
Chinese Office Action issued in Chinese Application No. 201580042006.8, dated Jul. 27, 2018.

* cited by examiner

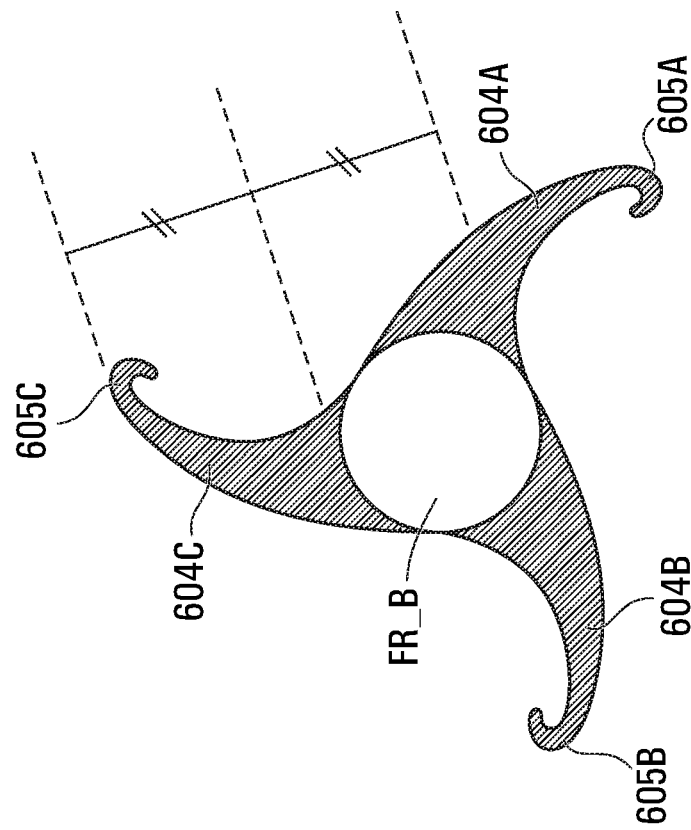
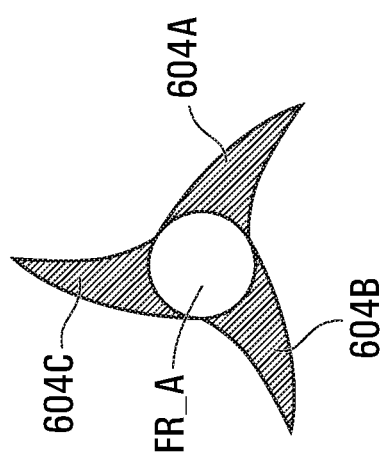

FLUIDIC TURBINE STRUCTURE

CROSS-REFERENCE TO RELATED APPLICATIONS

This application claims all benefit to, including priority to, and is a continuation-in-part of U.S. application Ser. No. 15/501,475, entitled "FLUID-REDIRECTING STRUCTURE", having a filing date of 5 Aug. 2015 (US national phase entry date 3 Feb. 2017), as a US National Phase Entry of PCT Application No. PCT/CA2015/050739, having a filing date of 5 Aug. 2015. This application also claims all benefit, including priority under 35 U.S.C. 119(e) from U.S. Provisional Patent Application Ser. No. 62/033,331 filed on Aug. 5, 2014. The contents of the aforementioned applications are incorporated by reference in their entirety.

FIELD

Embodiments of the present invention relate generally to fluidic turbines, and more particularly to a fluidic structure to be attached to the hub of a turbine.

INTRODUCTION

Horizontal-axis wind turbines for generating electricity from rotational motion are generally comprised of one or more rotor blades each having an aerodynamic body extending outwards from a main shaft that is supported by, and rotates within, a wind turbine nacelle. The rotor blades are examples of structures adapted to traverse a fluid environment, where the environment is primarily ambient air.

The nacelle is supported on a tower which extends from the ground or other surface. Wind incident on the rotor blades applies lift causing the rotor blades to move by rotating the shaft from which they extend about the horizontal rotational axis of the shaft.

The shaft is, in turn, associated with an electricity generator which, as is well-known, converts the rotational motion of the shaft into electrical current for transmission, storage and/or immediate use. Horizontal-axis wind turbines are generally very well-known and understood, though improvements in their operation to improve the efficiency of power conversion and their overall operational characteristics are desirable.

Incident wind at even low speeds can cause the rotor blades to rotate very quickly. As would be well-understood, for a given rotational velocity, the linear velocity of a rotor blade is lowest in the region of its root—the portion of the rotor blade proximate to the shaft.

Similarly, the linear velocity of the rotor blade is highest in the region of its tip—the portion of the rotor blade distal from the shaft. Particularly at higher linear velocities, aspects of the rotor blade can generate significant aeroacoustic noise as the rotor blade rapidly "slices" through air along its rotational path. This noise can be quite uncomfortable for people and animals in the vicinity to witness. However, the noise can also be an indicator that operation is not efficient, and maximum tip speed can actually be limited by such inefficiencies, including efficiencies made to the controller.

Horizontal-axis wind turbines are comprised of at least two and typically three rotor blades. The total swept path of the rotor blade(s) is considered to be the measure of the total kinetic energy available to the wind turbine in that plane. Current wind technologies are able to extract only a fraction of the kinetic energy of the incident wind.

The maximum theoretical value of kinetic energy extraction from the wind—which is known as the Betz Limit—was demonstrated in 1919 by Albert Betz according to a principle known as Betz's Law. According to Betz's Law, the maximum coefficient of performance (Cp) in wind kinetic energy extraction, the Betz Limit, is 59.3%.

This limit assumes that the incoming velocity of the wind is constant at every radial position within the swept area. However, due to inefficiencies in the root area of the blade, a low pressure area is developed which pulls air into the center of the swept area, a phenomena known as Rotor-Root Leakage, which decreases efficiencies below what they could be. A reverse in this phenomena could, in principle, exceed the Betz Limit by increasing the induction factor and mass flow through the rotor.

Current wind technologies have, in reality, a much lower Cp than the Betz Limit.

Efficiencies of wind turbines have been increasing in recent years, mostly through advances in rotor blade designs. However, some nascent research has begun to explore the utilization of wind incident in the central hub portion in front of the plane of rotor blade travel to improve efficiency and yield and decrease noise emissions.

European Patent Application No. EP2592265 to Orbrecht et al. discloses a power producing spinner for a wind turbine. This application describes an area for aerofoil extension over the root area of the rotor blade(s), connecting at the hub region and an upwind aerofoil portion disposed upwind of an inboard portion of each blade of the wind turbine; the wind turbine having a plurality of blades interconnected about an axis of rotation by a hub. The patent application further describes the ability of the power producing spinner to increase the efficiency of the wind turbine by increasing an axial induction to air flowing over the power producing spinner and directing an air flow outboard to aerodynamically useful regions of the blades.

U.S. Pat. No. 8,287,243 to Herr et al. discloses a spinner of a wind turbine. The air-flow in an inner rotor section may pass the rotor of the wind turbine without being used for energy production. A cylindrical spinner deflects wind around the rotor blade root(s) so that there is an increase in the efficiency of an existing wind turbine.

U.S. Pat. No. 9,200,614B2 to Kristian Godsk discloses a blade for a wind turbine, whereby this blade is an auxiliary blade that is attached to a hub and enables an increase in the planform of the blade in an area near the root along the plane of the larger wind turbine blade. The patent goes on to describe the effect of placing this auxiliary blade near a trailing and/or leading edge of a larger wind turbine blade.

U.S. Pat. No. 8,308,437B2 to Bharat Bagepalli et al. similarly discloses aerodynamic fins extending radially outward from the rotor hub alongside the root sections of a wind turbine blade and have an aerodynamic shape so as to capture wind and impart rotational torque to the hub from a central impinging wind zone that is coaxial to the rotor hub and the blade root sections.

United States Patent No. US20160040650A1 to Dmitry Floryovych Opaits et al. discloses a deployable aerodynamic component configured to be mounted to a wind turbine, which is structurally configured to cover a substantial portion of the inner portion of a wind turbine rotor.

United States Patent No. US20160311519A1 to Fulton Jose Lopez et al. discloses an aerodynamic dome component that is placed in front of a wind turbine hub to deflect wind away from that region and enable an acceleration of an airflow into a more aerodynamically efficient region of a wind turbine rotor blade providing an increase in efficiency of an existing wind turbine.

The control of yaw and blade pitch of a wind turbine is important to maintain maximal efficiencies, by containing wind incident to roughly 90 degrees from the spinning of the rotor blades.

Currently, this is achieved via active systems that reside at the base of the nacelle at the point of connection with the tower, as in U.S. Pat. No. 7,944,070 to Rosenvard et al. and U.S. Pat. No. 8,899,920 to Anderson. These active systems are controlled by sensors located on the exterior of the nacelle at the rear portion from first wind incident. Thus, these sensors are informed of wind conditions, most importantly speed and direction, after the wind has passed by the rotor blades. As such, there is a delay in the information of wind speed and direction to the active yaw and blade pitch system at the base of the nacelle.

European Patent Application Publication No. EP 2048507 to LeClair et al. discloses sensors located on the front of a nosecone. However, the sensors send their information to an active systems of motors and gears that are not able to actively move the turbine such that maximal efficiencies are generated without a feedback loop and subsequent delay. Furthermore, these systems similarly require electrical power to operate.

Traditional nosecones are attached to the hub through a spinner. The spinner may then be attached to the hub through several methods including struts and having its form wrap around the root(s) of the rotor blade(s) to secure it in place. Most of these methods require the blades to not be present for spinner attachment, which may be fine for assembling a new wind turbine but can be time consuming and costly for retrofitting an operating turbine.

Surface textures have also been known to improve the laminar flow over objects. These textures are often self-similar and repeating in nature. These may be recessed into the form, or project out of the form, and/or may also be U-shaped or V-shaped troughs that swerve or zig-zag in beneficial ways, or vortex generators that extend out of the form.

SUMMARY

The portion in front of the central hub where the rotor blade(s) are attached may be covered by a nose cone. The nose cone commonly acts as a protective shield for the hub of a wind turbine. To date, nose cones are not generally configured to aid in rotating the shaft of the wind turbine or to act in any way to produce energy.

To this end, the total swept path of the rotor blade(s) is considered to be the measure of the possible kinetic energy available to the wind turbine in that plane and that the kinetic energy of the wind upstream of the wind turbine hub is currently under-utilized.

In understanding this, Applicants have conducted extensive research and development into designing an aerodynamic device placed in front of the hub of a wind turbine that would improve its energy capture efficiency and possibly lead or ancillary benefits (e.g., an improved nosecone). Given its position and geometric limitations, a novel approach to aerodynamic design and engineering was required.

In looking at the geometry of a falling maple key, a novel geometry was arrived at through the design principal of biomimicry. In understanding what is known as the 'coning angle', and the aerodynamics at play with a maple key, it was understood how this object in nature maximizes efficiency through what is known as Time-Dependent Energy Transfer (TDET). This principle was then applied to the design of a novel fluidic structure, as described in various embodiments below. Variations are also contemplated in other embodiments.

A turbine, in some embodiments, is a rotary mechanical device that extracts energy by capturing motion from fluid flow. The fluid flow can, in some embodiments, be provided by way of wind (e.g., a wind turbine), a liquid (e.g., a water or tidal turbine). The turbine may include a rotor and attached rotor blades, which capture the motion from the fluid flow to rotate the rotor, which includes mechanisms to convert the mechanical rotation to another form, such as electrical power.

The effectiveness of a turbine is dependent on the aerodynamic performance of the turbine, and given the complexity of fluid flow dynamics, improving efficient operation of a turbine is a complex and challenging endeavour. The design and configuration of a turbine is also subject to practical cost constraints and environmental constraints.

As described in various embodiments, a fluidic structure (e.g., an improved nosecone) for turbine structures is described.

The improved fluidic structure improves the overall operational efficiency of the turbine. While capturing wind energy is a preferred embodiment, the improved fluidic structure is usable in multiple environments and fields, such as for use in turbines receiving a captive incident flow, such as a steam turbine (e.g., coal, natural gas, nuclear, sun condenser), hydro-electric power turbines, among others.

Other turbine structures contemplated include those where power is required to be inserted into the flow, such as aircraft propellers, ship propellers, turbofan engines, water pumps, radial impellers, and non-electrical rotary mechanisms, such as windmills.

In one embodiment of this application where power is desired to be extracted out of an incoming flow, the fluidic structure is attached or is configured for attachment to the hub or main shaft of a turbine and has improved geometric features which allow the fluidic structure to, in addition to protecting the turbine from increased loads through TDET, increase the efficiency of the turbine by providing at least one of (A) increased torque of the turbine at a main shaft and (B) re-directed incident flow to associated rotor blades (e.g., re-directing incident fluid to the suction side of the rotor blades) to reduce flow separation and associated turbulence. In some embodiments, the fluidic structure both increases torque of the turbine and re-directs incident flow to associated rotor blades (e.g., re-directing incident fluid to the suction side of the rotor blades).

In another embodiment of this application where power is desired to be inserted into the flow, the fluidic structure is attached or is configured for attachment to the hub or drive shaft of a device or structure. In the case of a propeller for a ship, the fluidic structure would be attached to the drive shaft of the ship and would have improved geometric features which would allow the fluidic structure to protect itself through the avoidance of the onset of cavitation through the principal of TDET, taking a longer timespan to accelerate the water, creating the required thrust in a more efficient manner, meaning less fuel consumption is needed to achieve the same nautical speed. This increases the relative rotative efficiency of the propeller ($\eta_R$), along with the propeller efficiency behind a hull ($\eta_P$), where $\eta_O$ is the propeller efficiency in open water:

$$\eta_P = \eta_O \times \eta_R \qquad \text{i.}$$

The relative rotative efficiency ($\eta_R$) is the efficiency with which the propeller rotates about its axis. Drag and in-flow conditions have a direct impact on this performance. Due to the fact that the water flow coming into a propeller's disk area behind a hull is neither constant or at right-angles, a slight rotation results from the act of a propeller spinning. This rotation aids in the relative rotative efficiency by 'pre-conditioning' the flow to accelerate along aligned trajectories, thereby limiting turbulence and associated drive shaft vibration. A geometry that aids in this phenomena would be beneficial to propeller performance, especially ones similar to those described in this application that employs TDET.

The fluidic structure in both cases is a rigid fixed pitch structure that rotates about a center axis. The fluidic structure is aligned to a main/drive shaft and contributes or delivers torque to the main shaft of the turbine or device or structure, through a combination of lift and/or drag principles, as required by the application.

The fluidic structure, of one embodiment, includes a geometrical structure having two or more curved fluidic elements that extend from an upstream tip that aligns to the center axis of rotation, to a downstream end at a radial position away from the center axis.

The fluidic structure rotates about the center axis, wherein the two or more curved fluidic elements contain chord sections that are wider at a upstream portion and relatively narrower at a downstream portion.

The fluidic structure is coupled to the turbine at the hub of the turbine, for example, as a retrofit to an existing turbine structure (e.g., replacing a nosecone that simply protects the hub) or as part of a manufactured turbine structure such that the turbine structure is a system having components which operate in concert to capture rotational motion for conversion into another form or another mode of energy. In alternate embodiments, the fluidic structure can also be permanently attached to the turbine structure. Various embodiments and structural variants are described herein.

In accordance with an aspect, there is provided a fluidic structure comprising a body having an upstream end, a downstream end, and an axis of rotation, the rigid body incorporating a plurality of curved fluidic elements (projections, channels, troughs, etc.) that extend from an upstream tip that aligns to the center axis of rotation, to a downstream end at some further radial position away from the center axis, and rotates about the center axis to contribute torque to the turbine. Downstream is a reference relative to the midpoint of the circular cross section of the root of the rotor blade, from the orientation of incident wind. The reference plane is the plane of the rotor blades. In contributing torque, the tip of the structure (e.g., fluidic element) is the first to have incident flow imparted upon it.

There may be different numbers of fluidic elements, in some embodiments, 2, 3, 4, 5, 6, 7, 8, 9, and 10 fluidic elements are considered. They may be evenly spaced from one another in some embodiments, or arranged irregularly in other embodiments.

The fluidic structure described herein may either be fully integrated with, or fitted and attached to, a hub structure of a turbine such as a horizontal-axis wind turbine, in the central position thereby to replace an existing nosecone.

The fluidic structure, when associated with a wind turbine, faces incident wind flowing from an upstream location towards a downstream location, receives the wind, and rotates in response to the flow of the incident wind in conjunction with rotor blades of the wind turbine as the incident wind pushes against and through the curved fluidic elements in its path from the upstream end through to the downstream end.

In a preferred embodiment, the fluidic structure rotates in unison with the rotor blades. The fluidic structure, when added to a wind turbine, become a part of the rotor, adapted to 'co-rotate with the rotor' (e.g., coupled and/or otherwise operatively connected together).

For example, the fluidic structure can be bolted in place, so it is fixed to the hub portion of the rotor, such that there should not be a difference in rotation between it and the rotor, so no there would be no extra vibration.

Furthermore, the fluidic structure directs the incident wind reaching the downstream end of the curved fluidic elements outwards and along the elements in a direction substantially normal to the axis of rotation and thereby along the suction side of a respective rotor blade of the wind turbine.

The curved fluidic element portion at the downstream end of the fluidic structure is generally aligned with an upwind power producing rotor blade portion, and in embodiments like the rotor blade may assume the shape of an aerofoil and/or may form a new leading edge section of the rotor blade(s) and/or may form a new trailing edge section of the rotor blade(s). Generally aligned includes substantial alignment in the radial direction, such that the airfoil sections of the 'projection' best align flow to pass over the suction side of the rotor blade. The alignment is utilized to maximize power and limit turbulence and undue loads, although there may be some variation in the alignment.

The fluidic structure thereby acts to harness incident wind that is still upstream of the plane of the rotor blades of the wind turbine to rotate the hub, thereby to increase the efficiency and/or decreases the noise emissions and loading of the wind turbine as a whole through its application and use and by increasing the time over which energy extraction occurs, known as time-dependent energy transfer.

Further, the direction and re-distribution of the kinetic energy of incident wind away from the axis of rotation of the turbine but against the rotor blades provides a source of kinetic energy that, in alternate approaches, had been lost from the hub area, through the creation of a low pressure region through the phenomena of Rotor-Root Leakage.

In accordance with another aspect, there is provided a fluidic structure for a turbine comprising a rigid body attachable to a hub structure of the turbine and incorporating a plurality of curved fluidic elements each for receiving and directing wind incident on the rigid body through the process of drag and lift against a suction side of a corresponding turbine blade.

In an embodiment, the fluidic structure can be retrofitted to existing turbines either in lieu of, or in conjunction with, a standard paraboloidal nose cone thereby to provide efficiency and power-generating benefits to the existing turbine.

The direction in which the fluidic elements are curved with respect to the axis of rotation is chosen to correspond with the opposite direction of the rotational direction of the drive shaft and rotor blades. The curve is based on maximizing the radial alignment with the rotor blade, such that the airfoil sections of the projection best channel flow onto the rotor. Different rotor blade configurations relate to very slight differences in curve geometry in 3D space.

As such, a counterclockwise direction of intended rotation for the rotor blade(s) would coordinate with a clockwise spiral for the troughs of the fluidic device around the axis of rotation, whereas a clockwise direction of intended rotation for the rotor blade(s) would coordinate with a counterclockwise spiral for the troughs of the fluidic device around the axis of rotation.

Various embodiments provide description of opportunities for improving on the traditional aspects of a nosecone for a wind or water turbine. The biologically-inspired configurations can conveniently be retrofitted onto the hub structure of a turbine, originating in front of the plane of movement of the rotor blade(s), and terminating behind said plane. The fluidic structures described herein aim to produce rotational motion in the drive shaft of a turbine using incident fluid, such as wind, that is in front of the plane of the rotor blade travel as well as to direct such incident fluid that is in front of the hub structure to the suction side of the power producing regions of the rotor blade(s), thus increasing the overall efficiency of the turbine by using the underutilized energy available in the fluid in the hub area, thus creating an area of high pressure. This area of high pressure also directs the incoming flow to move towards outer radial positions of the turbine, thus having an indirect effect through the creation of pressure differentials that usefully creates a higher induction factor and generates more mass flow through the rotor at a given flow velocity.

Through embodiments described herein, the wind turbine with the fluidic structure may encounter an increase in efficiency with the current invention integrated, beyond what is available from the conventional approaches. A similar increase in efficiency may also be seen if one wind turbine with the fluidic structure integrated is installed upwind of another wind turbine with a fluidic structure integrated. The sum total of multiple wind turbines with the installed fluidic structure may be more than any one wind turbine in that wind farm, due to macro effects involving the wake of the improved wind turbine.

In some embodiments, the upstream tip of the fluidic structure contains a sensor and associated data system for determining environmental and turbine conditions, wherein data from the sensor and associated data system integrated into the primary turbine's supervisory control and data acquisition system.

In some embodiments, the curved fluidic elements contain associated load cells and where the upstream tip contains a sensor system suitable for determining environmental and turbine specific data, coupled to at least one of a condition monitoring system and a supervisory control and data acquisition system.

In some embodiments, the fluidic structure is configured to attach to a hub structure using an adjustable system of brackets and hard-points that allow for changes along a plane of the axis of rotation and in azimuth positions.

In some embodiments, the fluidic turbine is a horizontal-axis wind turbine and the fluidic structure is the only aerodynamic structure providing torque to a main shaft.

In some embodiments, the fluidic turbine is a horizontal-axis wind turbine with a rotor mounted to a hub section at a root portion with a plurality of blades comprising up a rotor plane, each blade of the plurality of blades having a leading edge, a trailing edge, a pressure side, a suction side and having aerofoil sections adapted to extract energy from wind through lift and provide torque to a main shaft; the fluidic structure is an aerodynamic nosecone having two or more curved fluidic elements that meet at a tip upstream from the rotor plane and a further radial position downstream from the rotor plane.

In some embodiments, the fluidic turbine is a at least one of horizontal-axis tidal turbine, hydroelectric dam turbine, a kite turbine, a high altitude wind power (HAWP) device, or a kite wind turbine, and the fluidic structure is the only fluid-dynamic structure providing torque to a main shaft.

In some embodiments, the fluidic turbine is at least one of a vertical-axis tidal turbine, hydroelectric dam turbine, a kite turbine, a high altitude wind power (HAWP) device, or a kite wind turbine, and the fluidic structure is the only fluid-dynamic structure providing torque to a main shaft.

In some embodiments, the fluidic turbine is a horizontal-axis tidal turbine, with a rotor mounted to a hub section at a root portion with a plurality of blades comprising up a rotor plane, each blade of the plurality of blades having a leading edge, a trailing edge, a pressure side, a suction side and substantially having hydrofoil sections designed to extract energy from water and provide torque to a main shaft, the fluidic structure is a hydrodynamic nosecone with an tip upstream from the rotor plane and a further radial position downstream from the rotor plane.

In some embodiments, the aerodynamic nosecone includes the curved fluidic elements that are adapted to gradually harness power from an incoming airflow and improve the efficiency of the primary turbine in a proximate vicinity to the fluidic turbine through concentration of such airflow from the center axis of rotation to a further radial position and, the curved fluidic elements adapted to guide said airflow onto the suction side of the blade, reducing flow separation, turbulence and associated vibrations.

In some embodiments, the aerodynamic nosecone includes the curved fluidic elements and is adapted to create an area of useful high pressure around the hub and root portion of the rotor, promoting incoming airflow to accelerate radially away from the hub upstream of the rotor and improving the efficiency of the primary turbine by increasing the an axial induction factor and mass flow through the rotor.

In some embodiments, the curved fluidic elements act to gradually harness power from an incoming water flow and improve the efficiency of the turbine in a downstream vicinity through the concentration of such water flow from a center axis of rotation to a further radial position and guide said water flow onto the suction side of the blade, reducing flow separation, cavitation, turbulence and associated vibrations.

In some embodiments, the curved fluidic elements act to create an area of high pressure around the hub and root portion of the rotor, causing the incoming water flow to accelerate radially away from the hub upstream of the rotor, improving the efficiency of the entire turbine by increasing an axial induction factor and mass flow through the rotor.

In some embodiments, the fluidic turbine includes an ultra-sonic noise inducer at the upstream tip specifically programmed to deter bats and other avian species from flying near the turbine by producing a noise that is not audible to humans.

In some embodiments, the fluidic structure is integrated with, or fitted and attached to, a hub structure of a fluidic turbine in a central position in-line with a center axis of rotation to replace an existing nosecone either while the fluidic turbine is installed in an operational environment of the primary turbine or in a factory setting as part of fabrication of the primary turbine.

A corresponding method for operating a fluidic turbine, wherein a sensor system is configured to determine environmental and turbine specific data, and includes at least one of a forward facing LiDAR unit coupled to a tip of a fluidic structure that provides a feed-forward data stream of LiDAR information to reduce unwanted loads and operational phenomena on a primary turbine's rotating components and supporting structure, while improving the power performance through anticipatory control procedures and defined operating approaches and thresholds, wherein; a pitchable rotor blade is controllable to set a desired angle of attack, rotating components of the primary turbine or the fluidic structure are controllable to be yawed to one or more desired orientations; the method comprising: detecting, at a first detection plane spaced away from the fluidic turbine, a feed-forward data stream of LiDAR readings representing wind speed characteristics at the first detection plane; processing feed-forward data stream in a data architecture system configured to generate a series of mechanical control command signals responsive to the wind speed characteristic readings, the series of mechanical control command signals modifying at least the desired angle of attack and the one or more desired orientations of the rotating components; wherein the data architecture system is configured to refresh control decisions in real or near real-time.

In some embodiments, the method further includes detecting, at one or more load cells physically coupled to one or more curved fluidic elements of the fluidic structure, a strain level indicative of a load factor on the coupled one or more curved fluidic elements to be stored in data storage as one or more load factor data sets; processing, by the data architecture system, the one or more load factor data sets to establish an error metric between the series of mechanical control command signals and the wind speed characteristics; updating, by the data architecture systems, one or more control characteristics of the data architecture system to reduce the error metric, the one or more control characteristics including at least a compensatory lag time between a time when the series of mechanical control command signals are utilized to modify the at least the desired angle of attack and the one or more desired orientations of the rotating components and a time when the wind speed characteristics are measured.

In some embodiments, a method of manufacturing an aerodynamic nosecone is described including a hub that rotates about a center axis, aligned to a main shaft; and, a fluidic structure configured to be mounted onto the hub of a primary turbine that contributes torque to the main shaft of the primary turbine through increasing at least one of lift and drag, with composite materials, the method comprising: fabricating a mould from a computer-aided design (CAD) file; laying layers of glass and carbon fibre are laid into the mould with epoxy between the layers and allowed to set to produce a hardened product that resembles the CAD file.

In some embodiments, the method for manufacturing includes installing a flange and plate on the hub of a pre-erected wind turbine, and whereby the majority of the mounting structure of claim 4 is pre-assembled and attached to the aerodynamic nosecone on the ground, prior the whole structure is raised via a crane into position, and attached to the wind turbine via the pre-installed flange and plate.

In some embodiments, a method of shipping the aerodynamic nosecone including a hub that rotates about a center axis, aligned to a main shaft; and a fluidic structure configured to be mounted onto the hub of a primary turbine that contributes torque to the main shaft of the primary turbine through increasing at least one of lift and drag, wherein the fluidic structure includes two or more curved fluidic elements that extend from an upstream tip that aligns to the center axis of rotation, to a downstream end at a radial position away from the center axis, and rotates about the center axis to contribute torque to the primary turbine; and, wherein the two or more curved fluidic elements contain chord sections that are wider at a upstream position relative to a downstream position, the method comprising: stacking each of the two or more curved fluidic elements one atop each other, and depositing the two or more curved fluidic elements one atop each other inside a shipping container or on a bed of a flatbed truck.

Other aspects as well as advantages will be described herein.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

Figure 1:
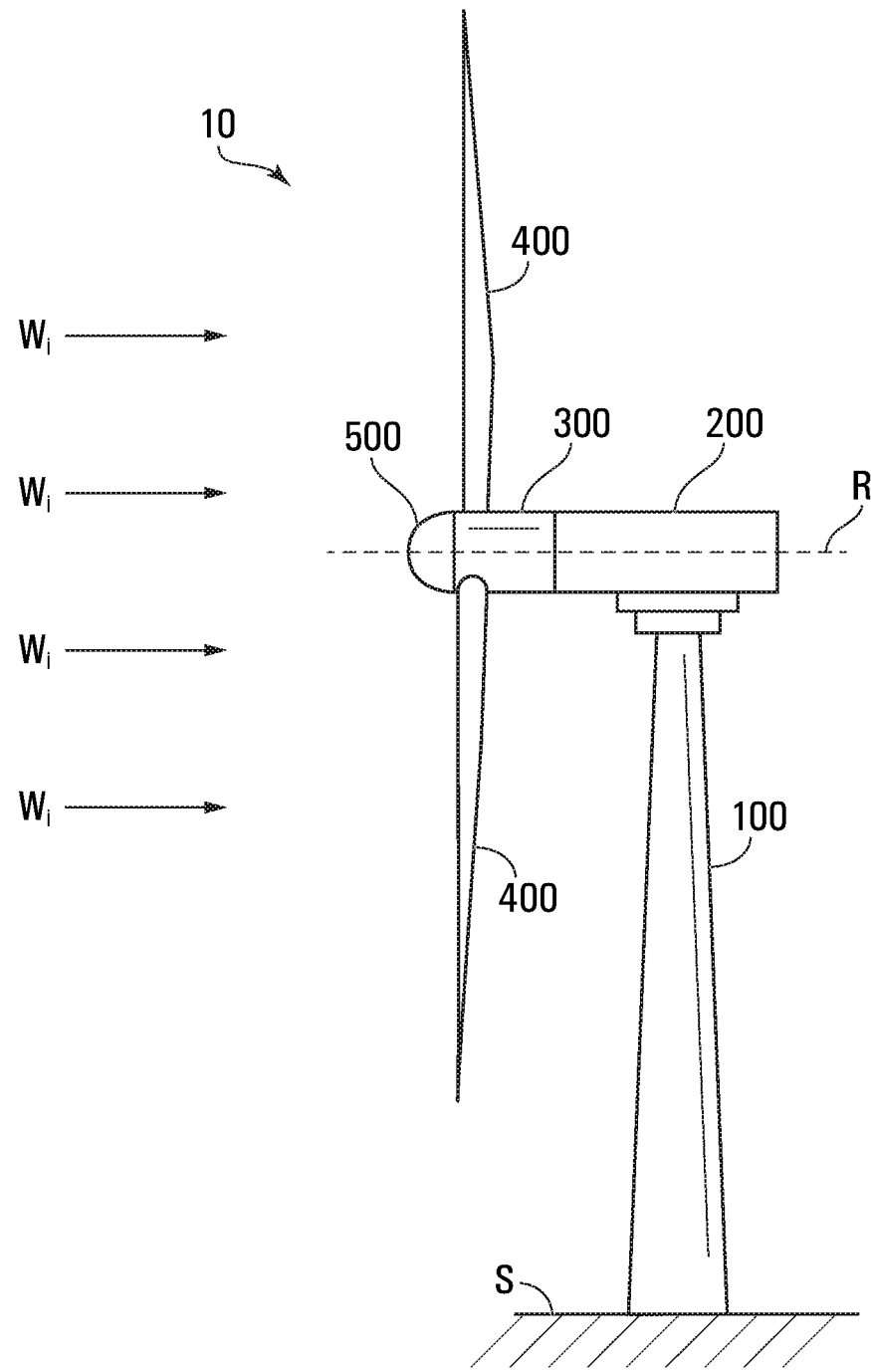
Figure 2A:
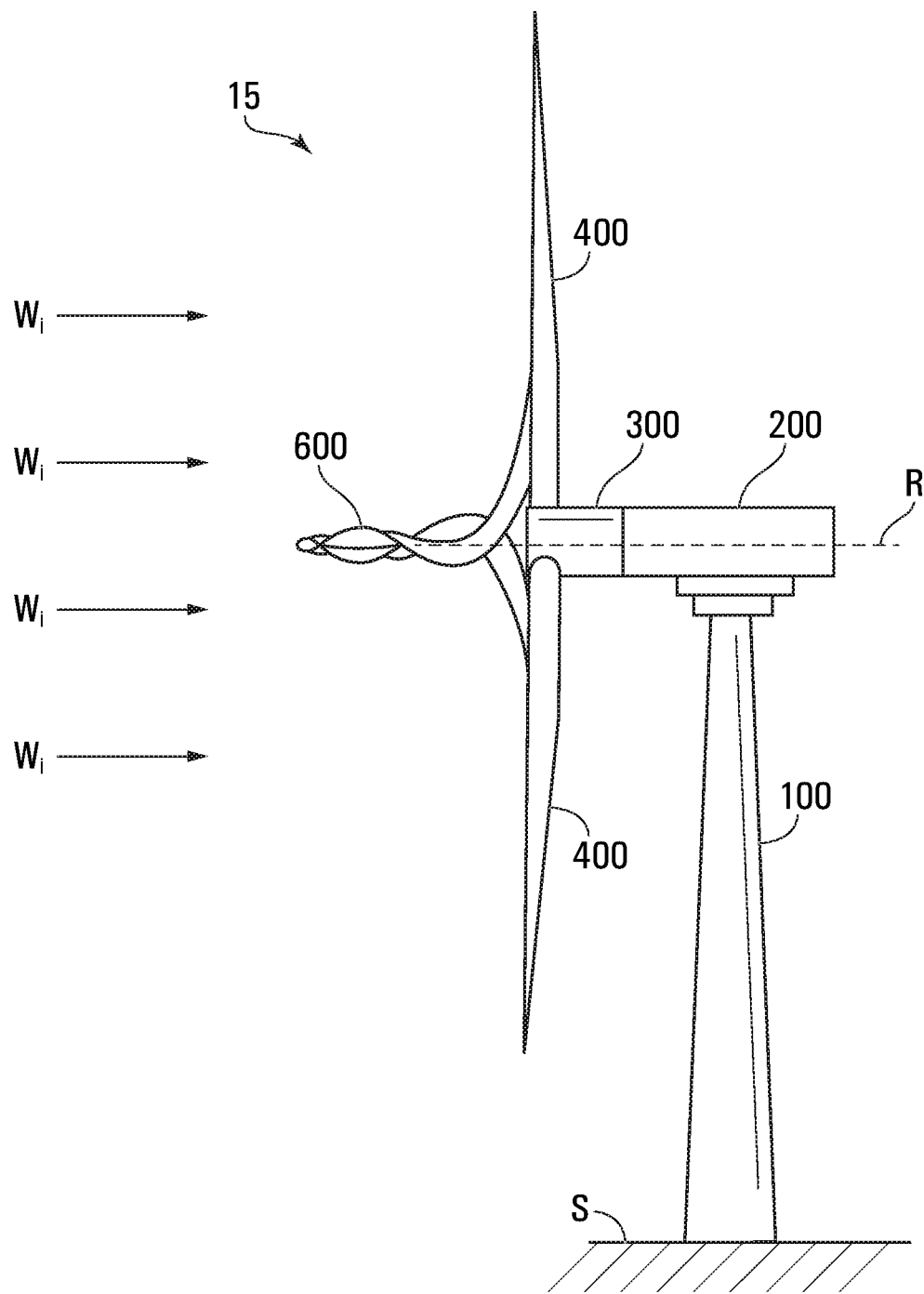
Figure 2B:
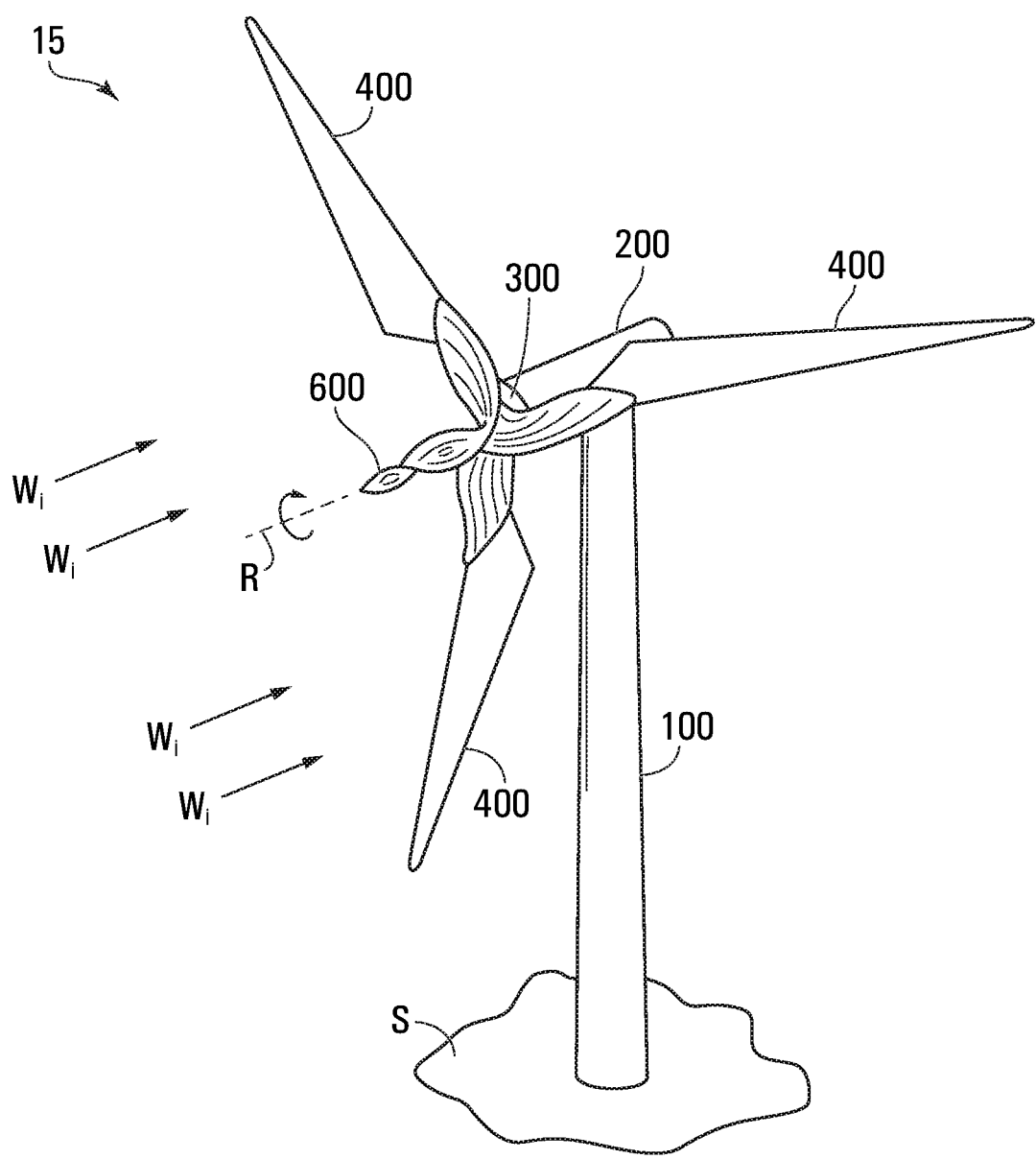
Figure 3A:
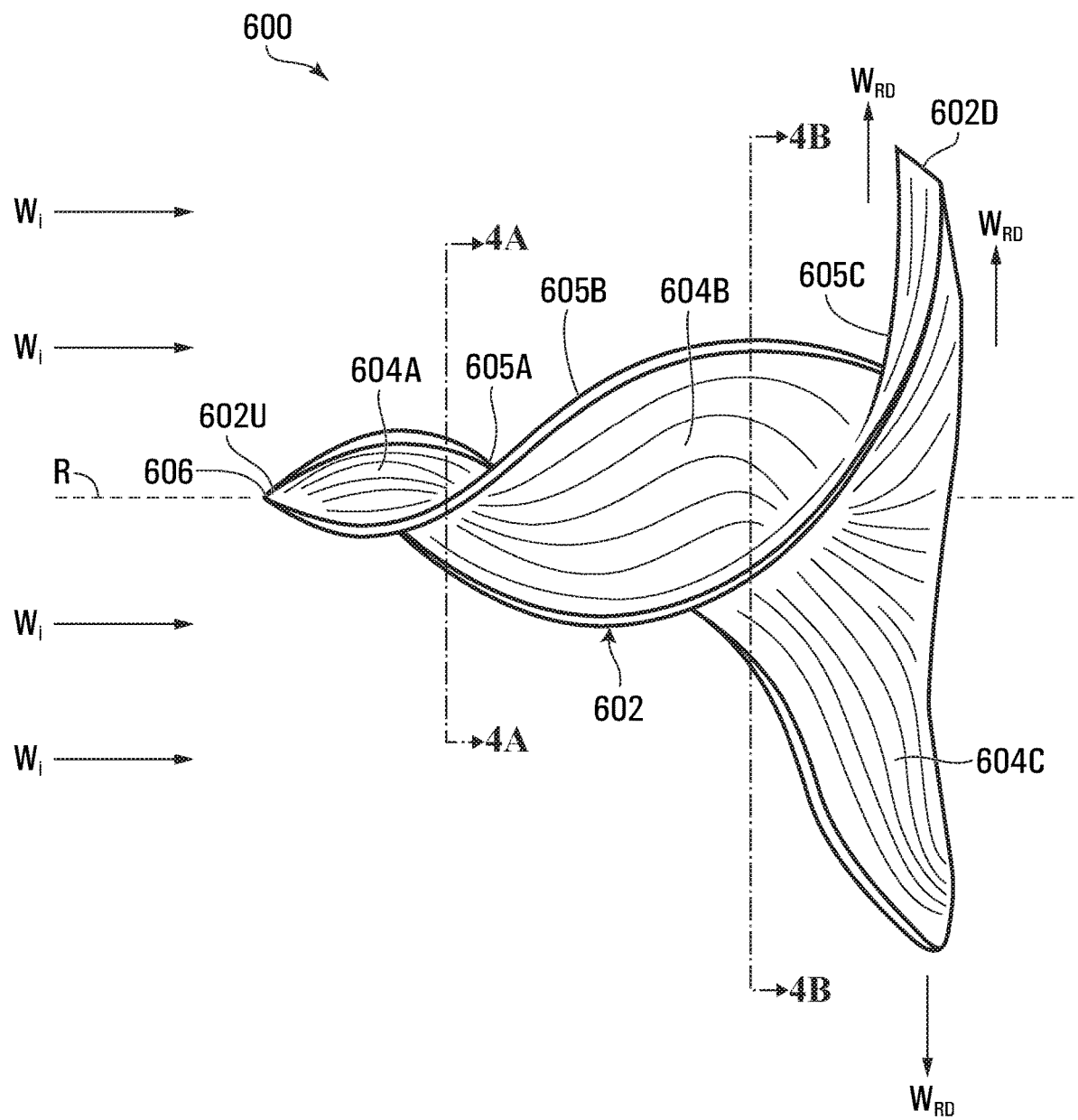
Figure 3B:
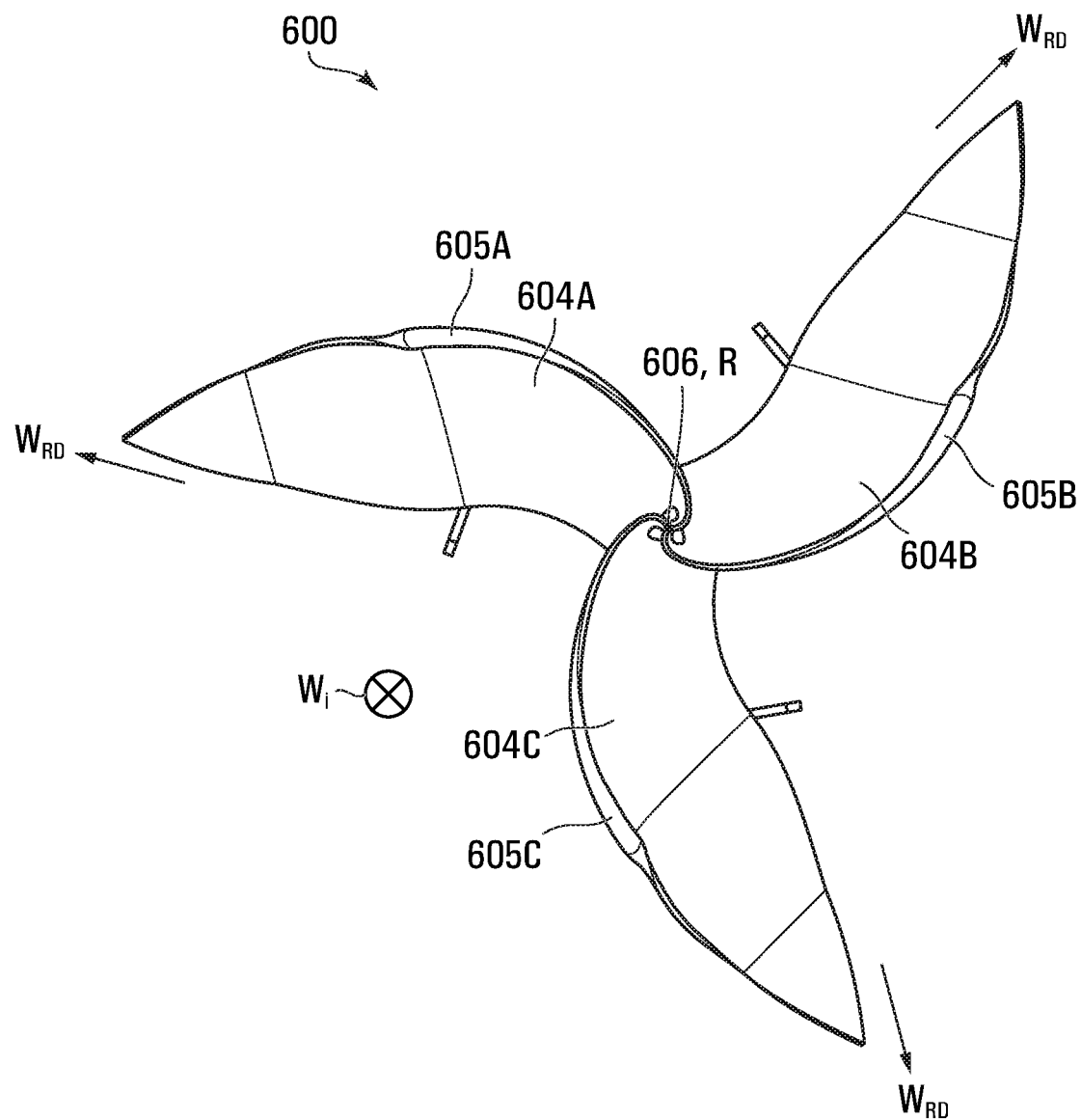
Figure 6:
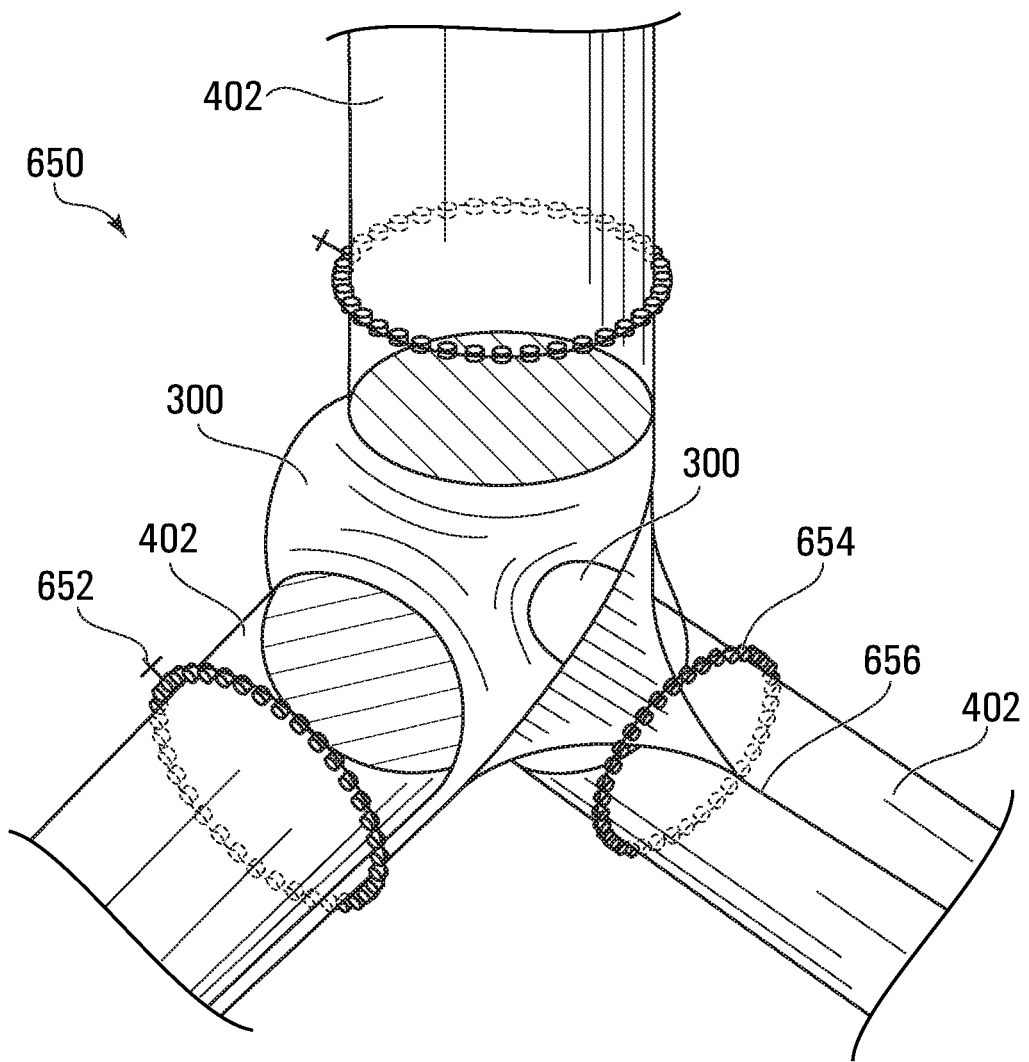
Figure 7:
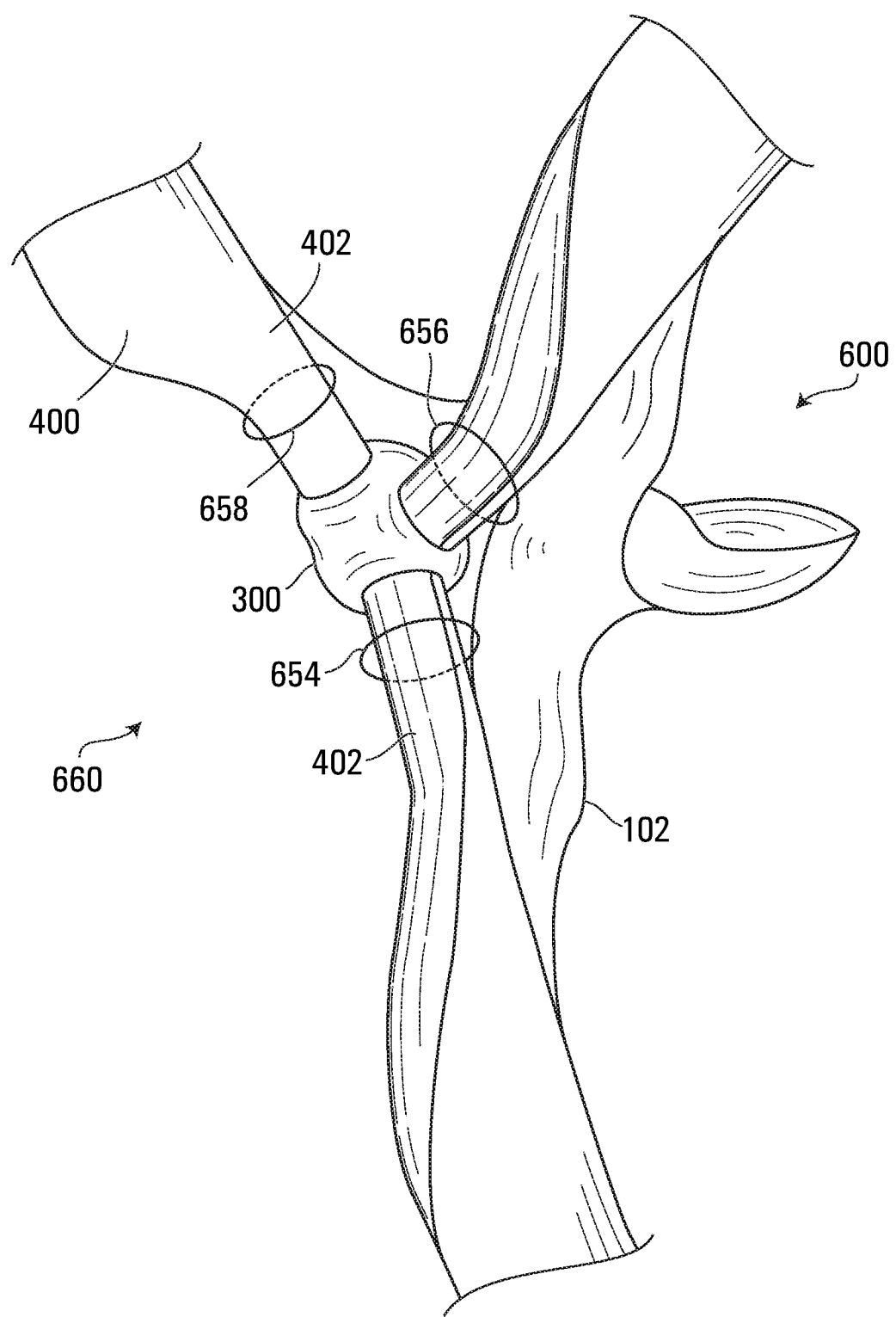
Figure 8:
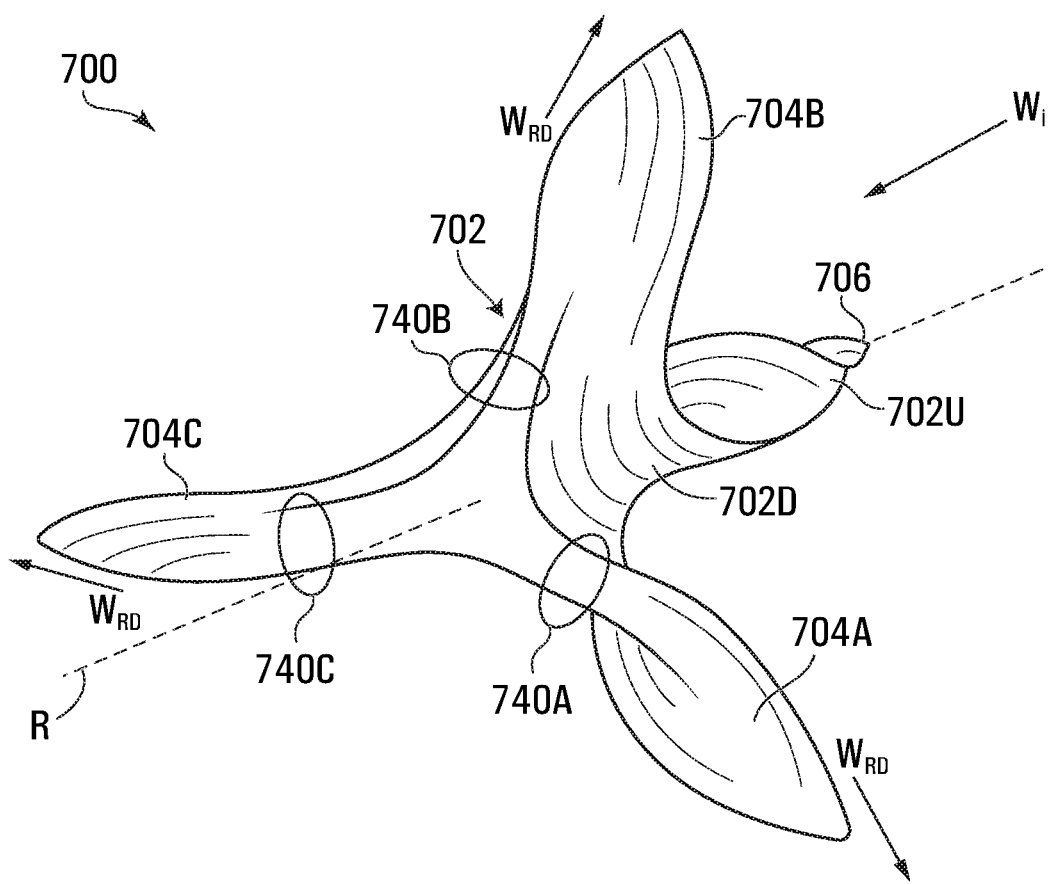
Figure 9:
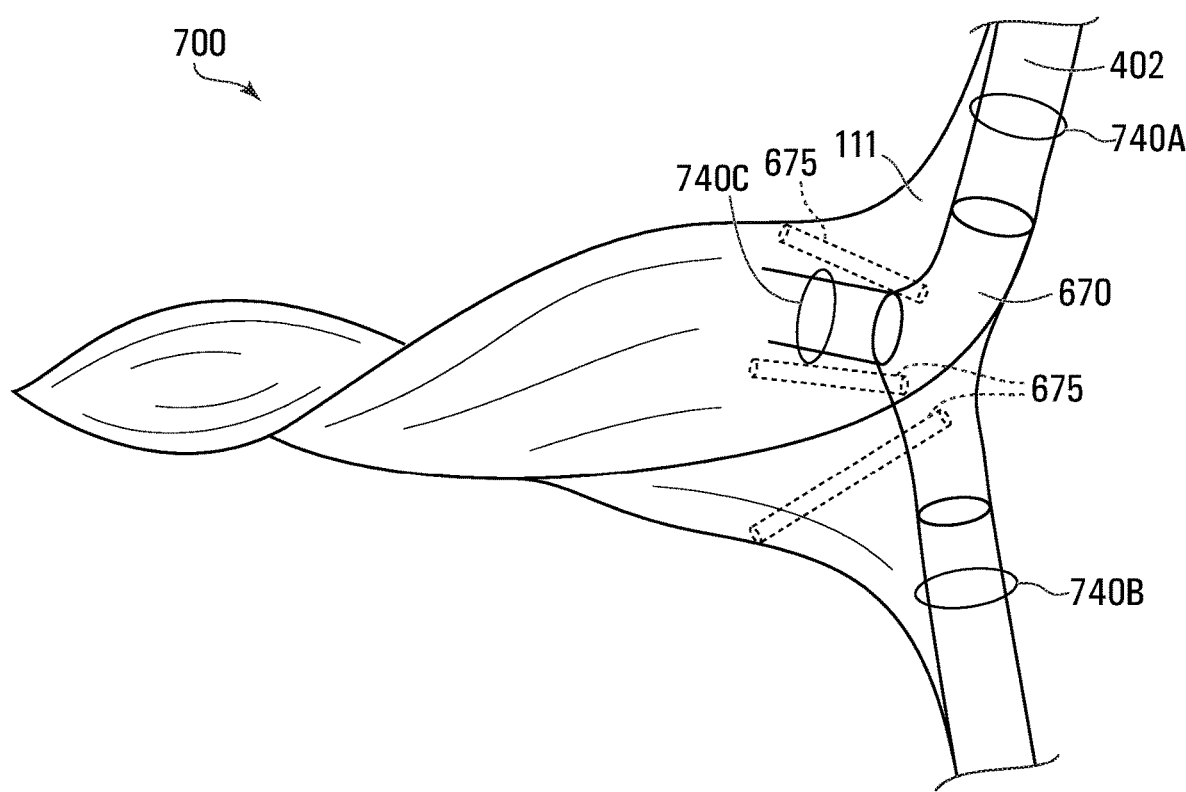
Figure 10:
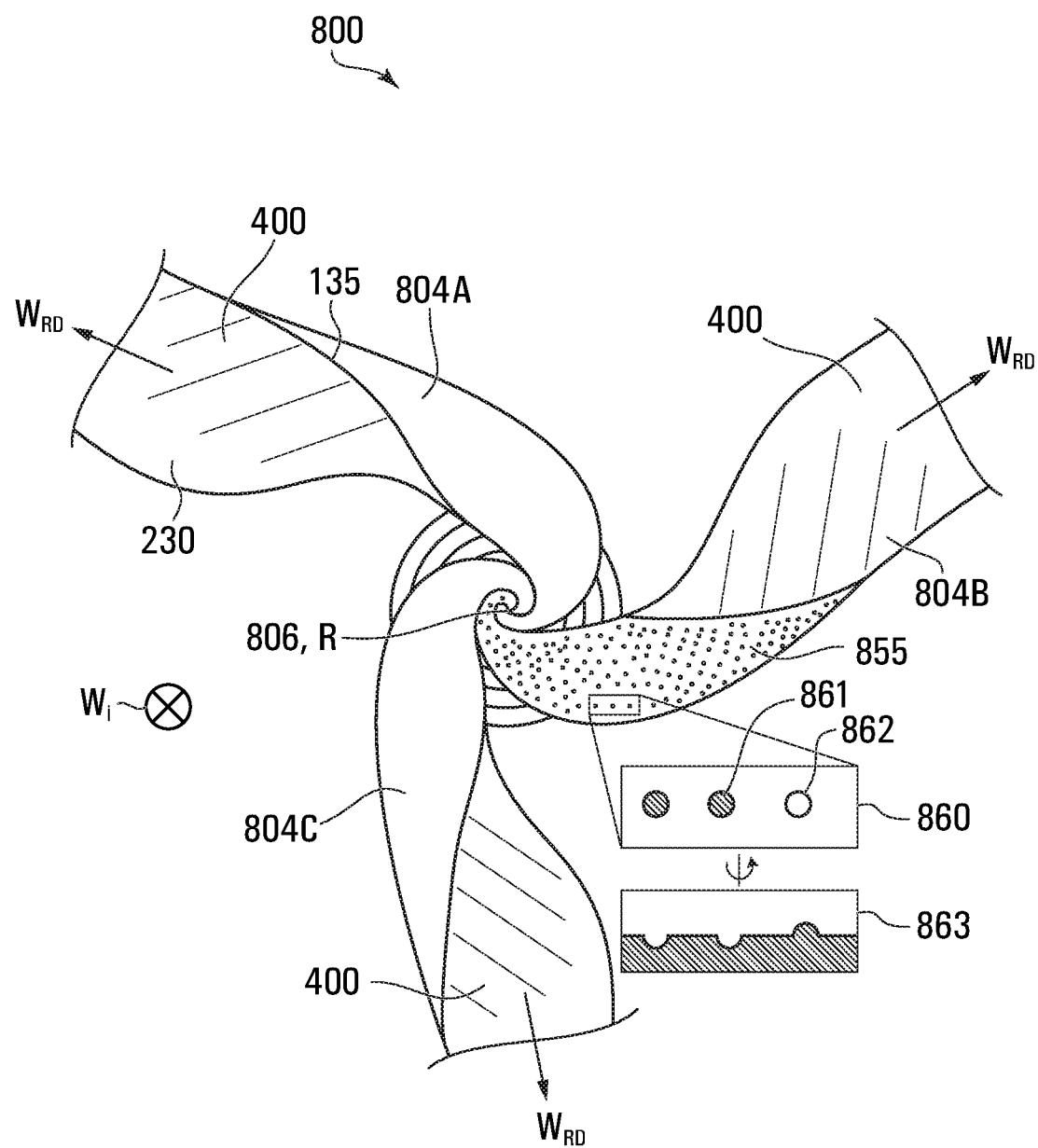
Figure 11:
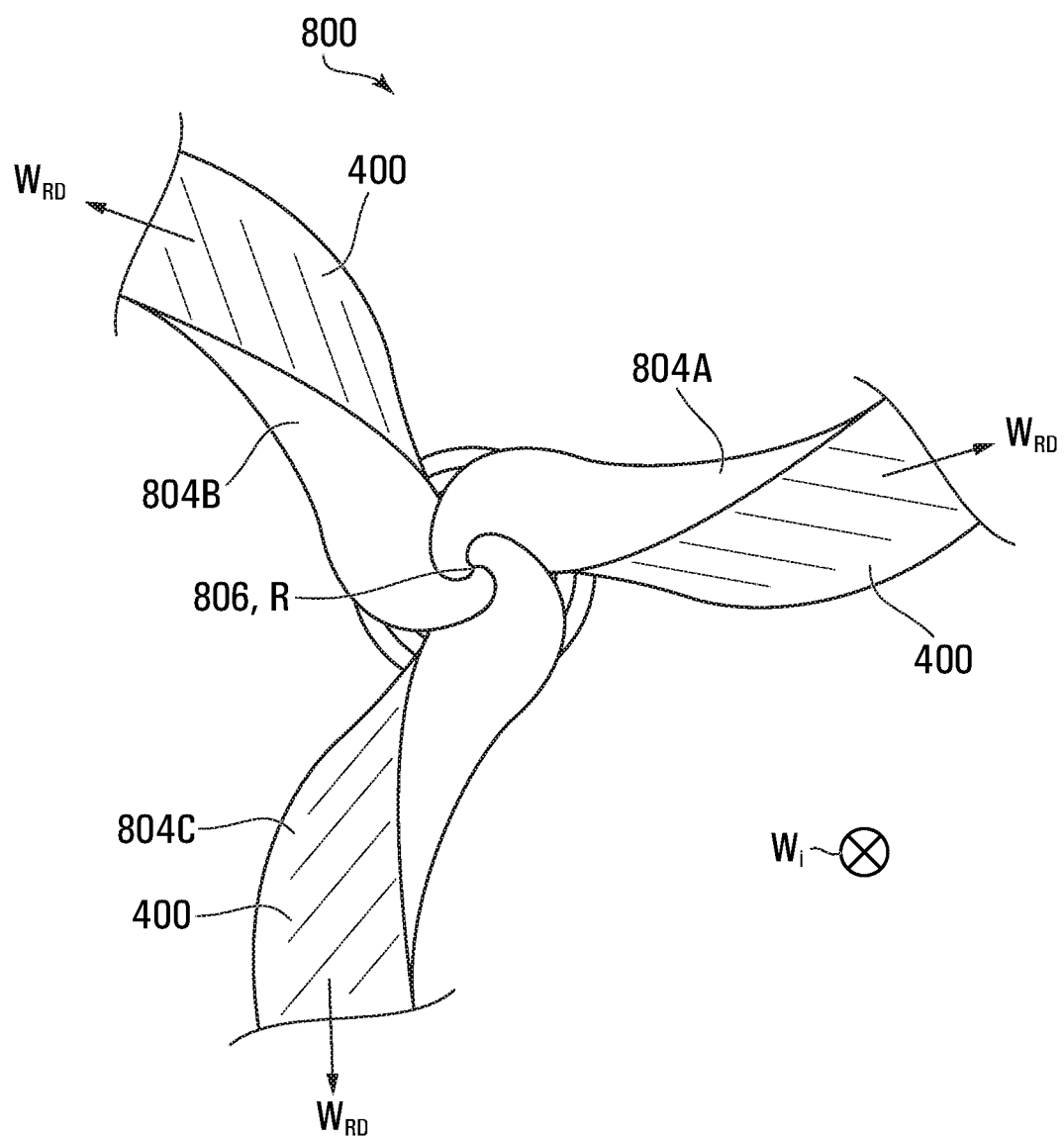
Figure 12:
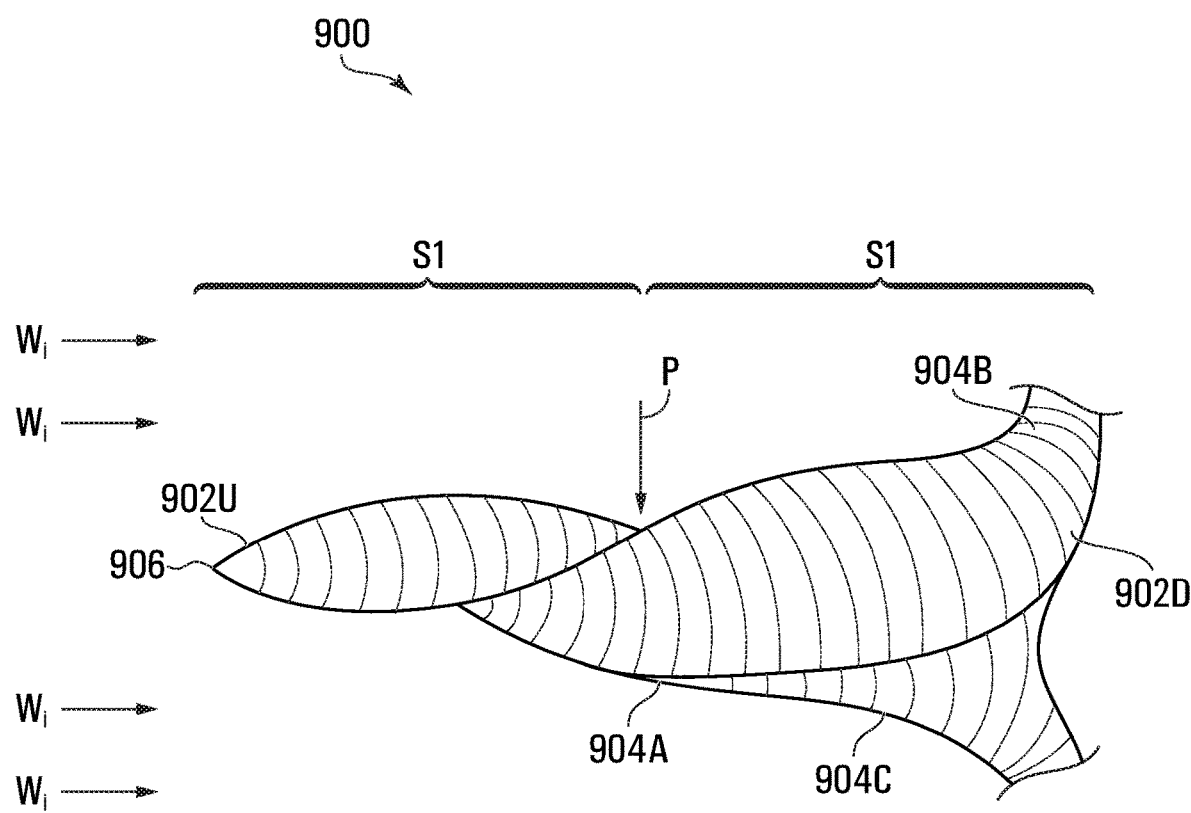
Figure 13:
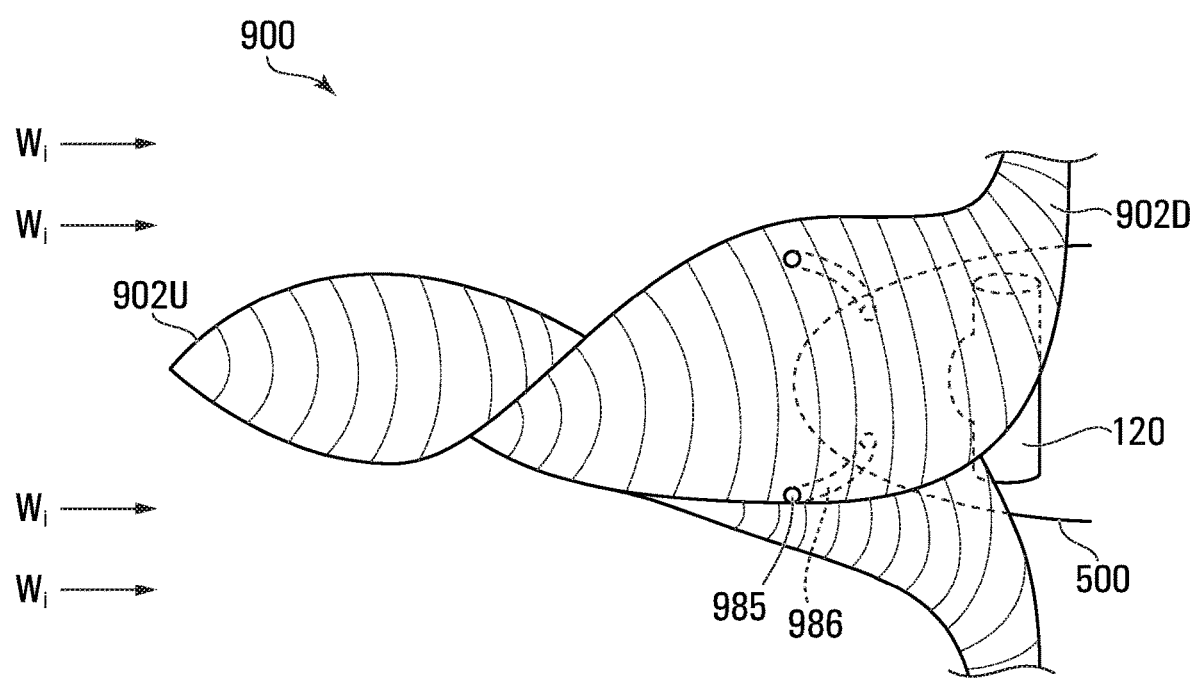
Figure 14:
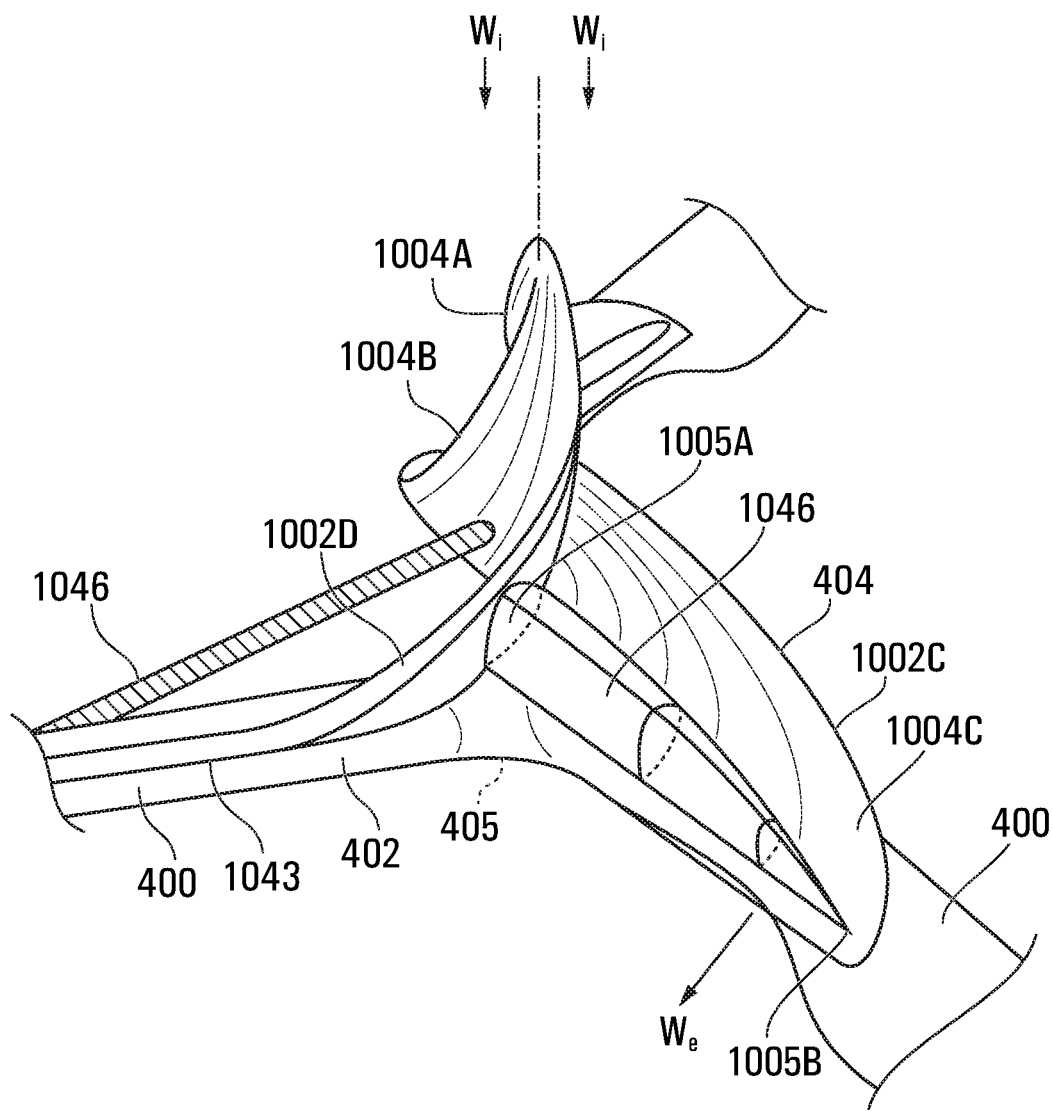
Figure 15:
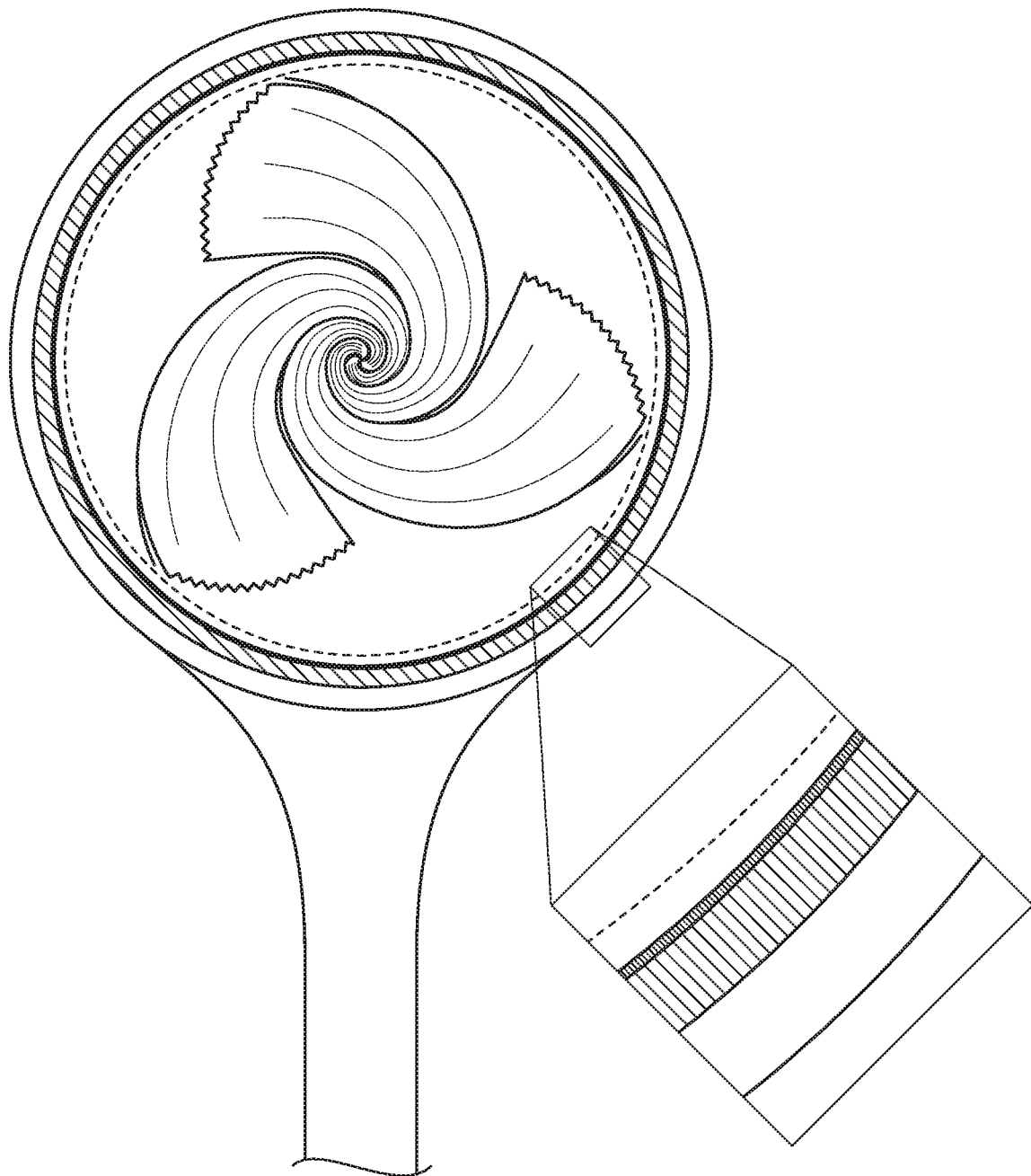
Figure 16:
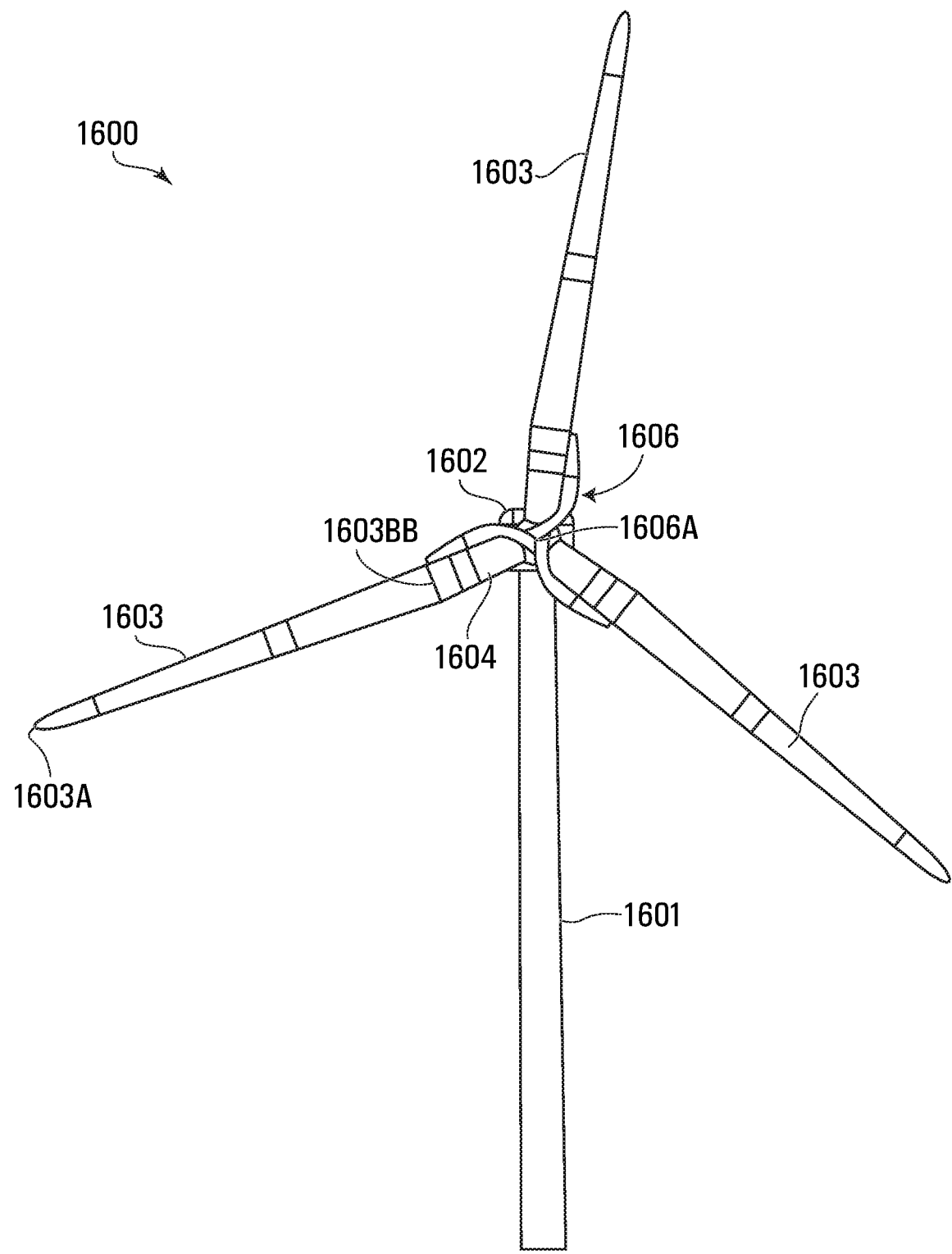
Figure 17:
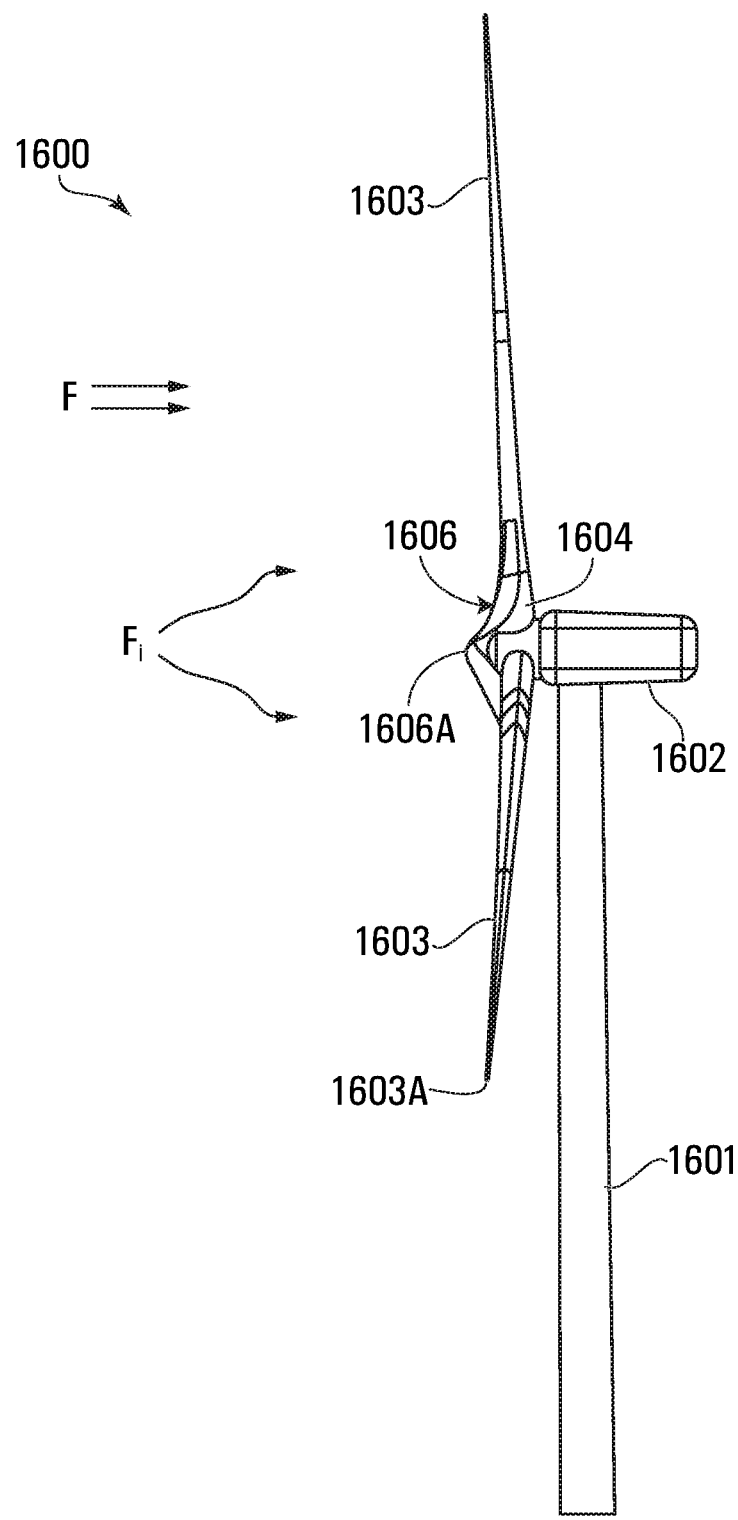
Figure 18:
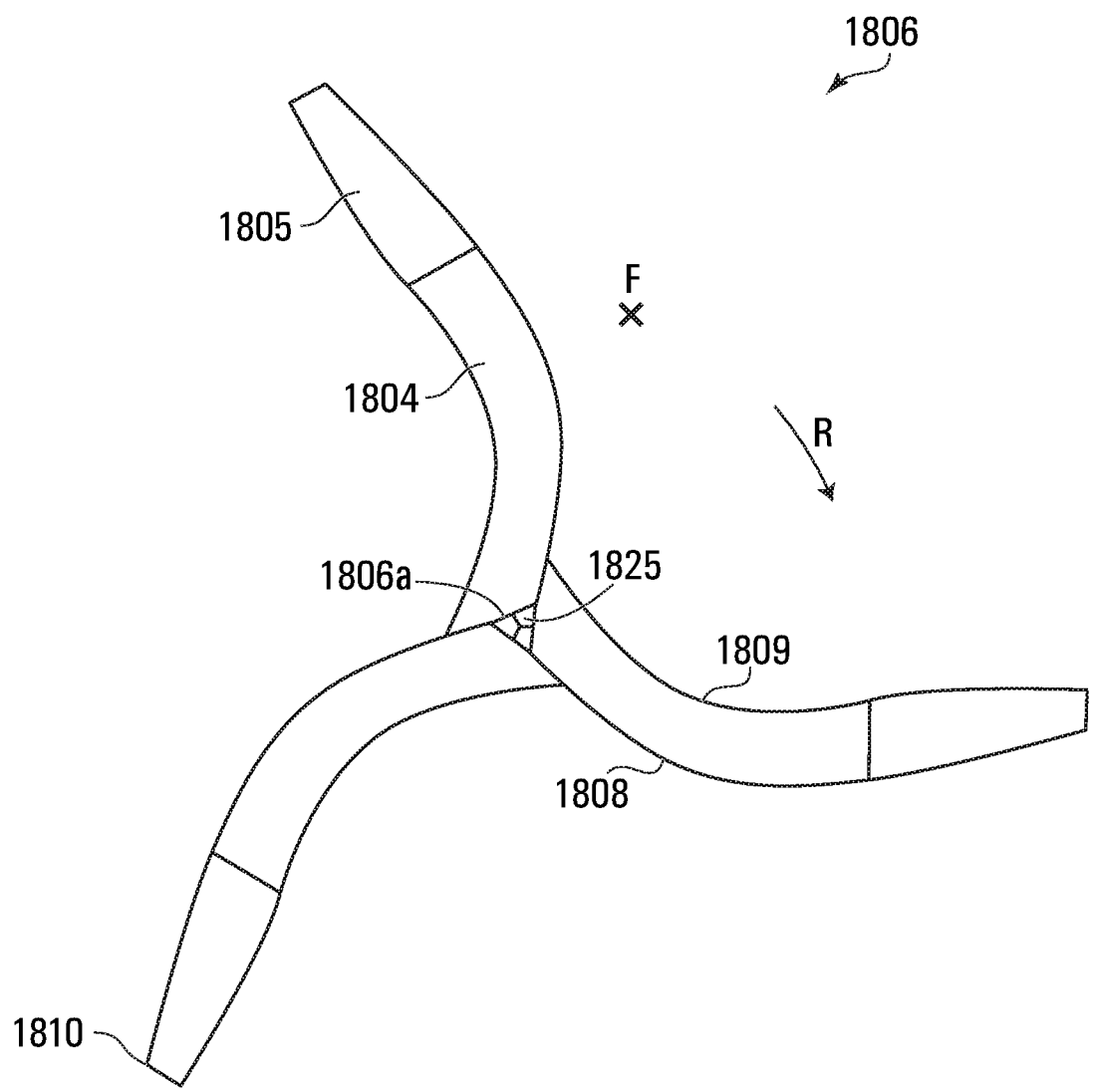
Figure 19:
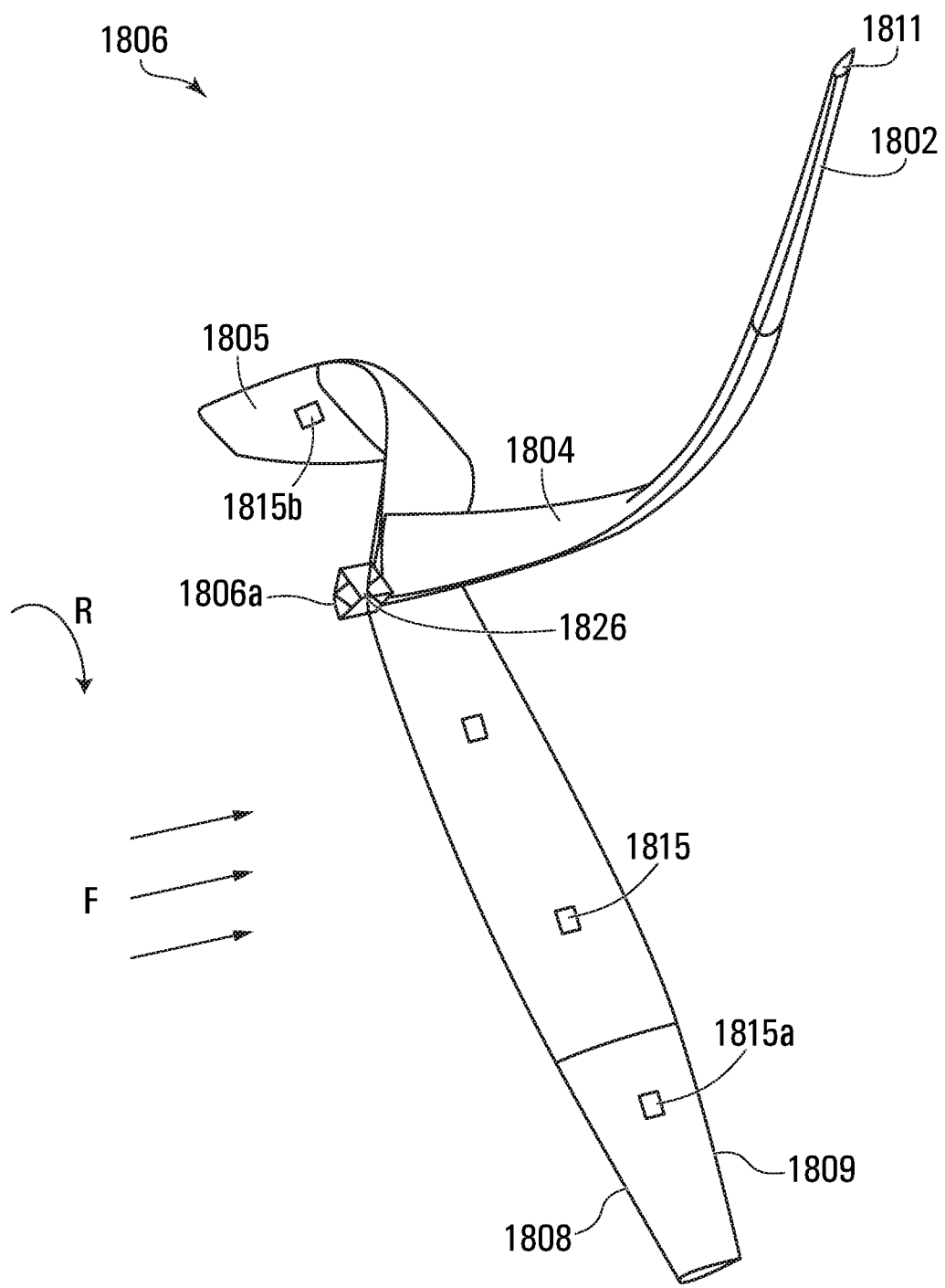
Figure 20:
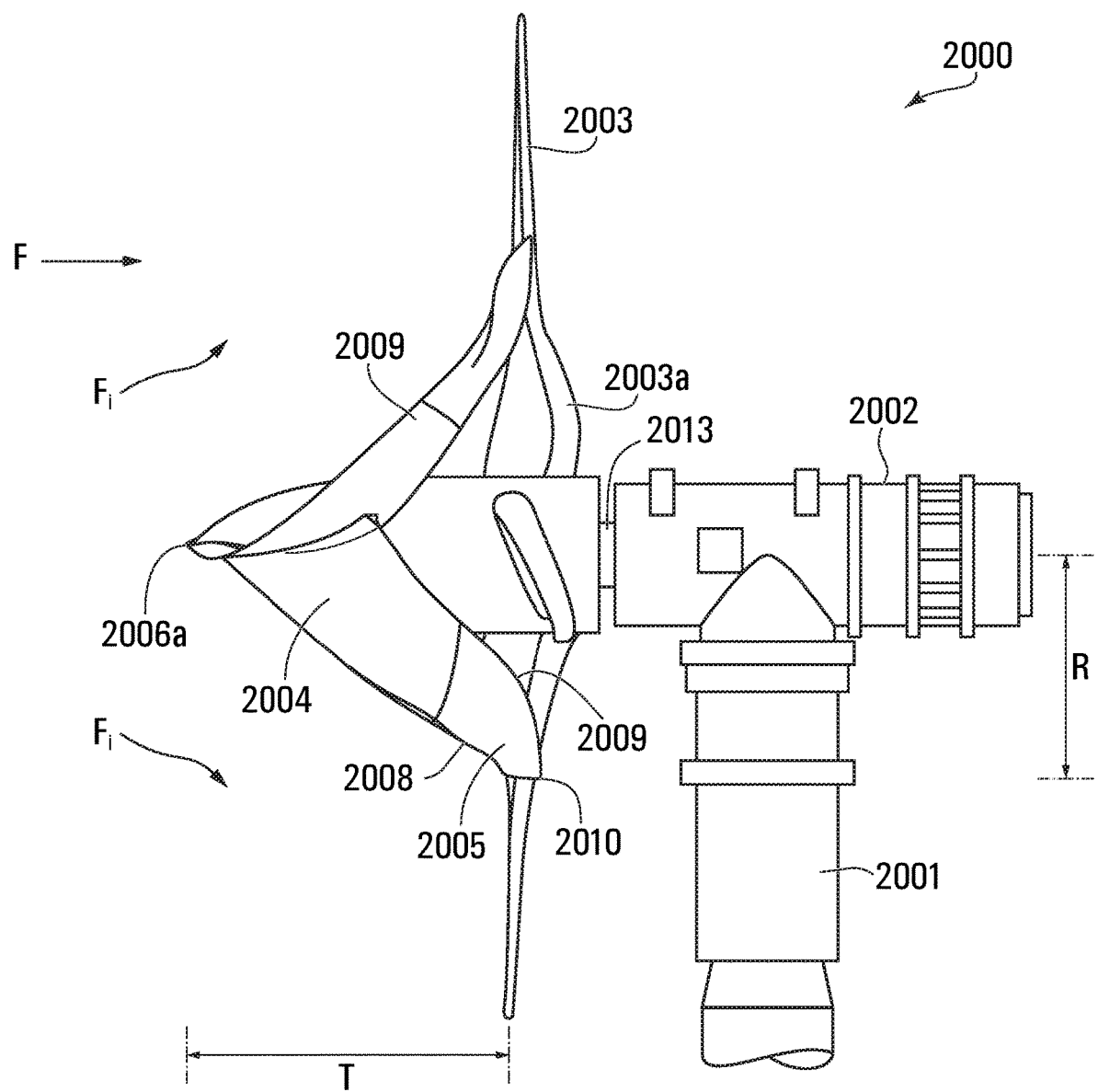
Figure 21:
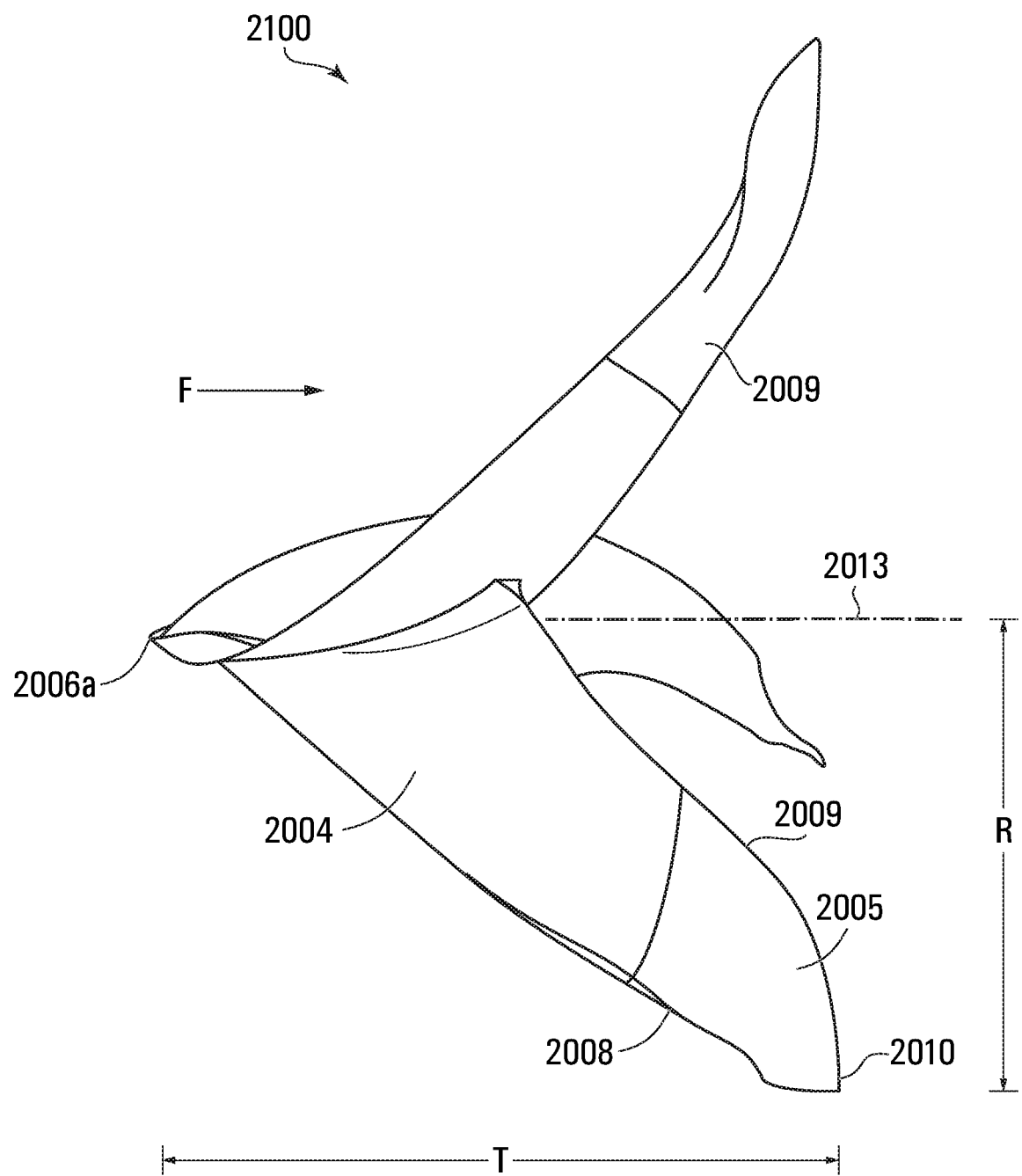
Figure 22:
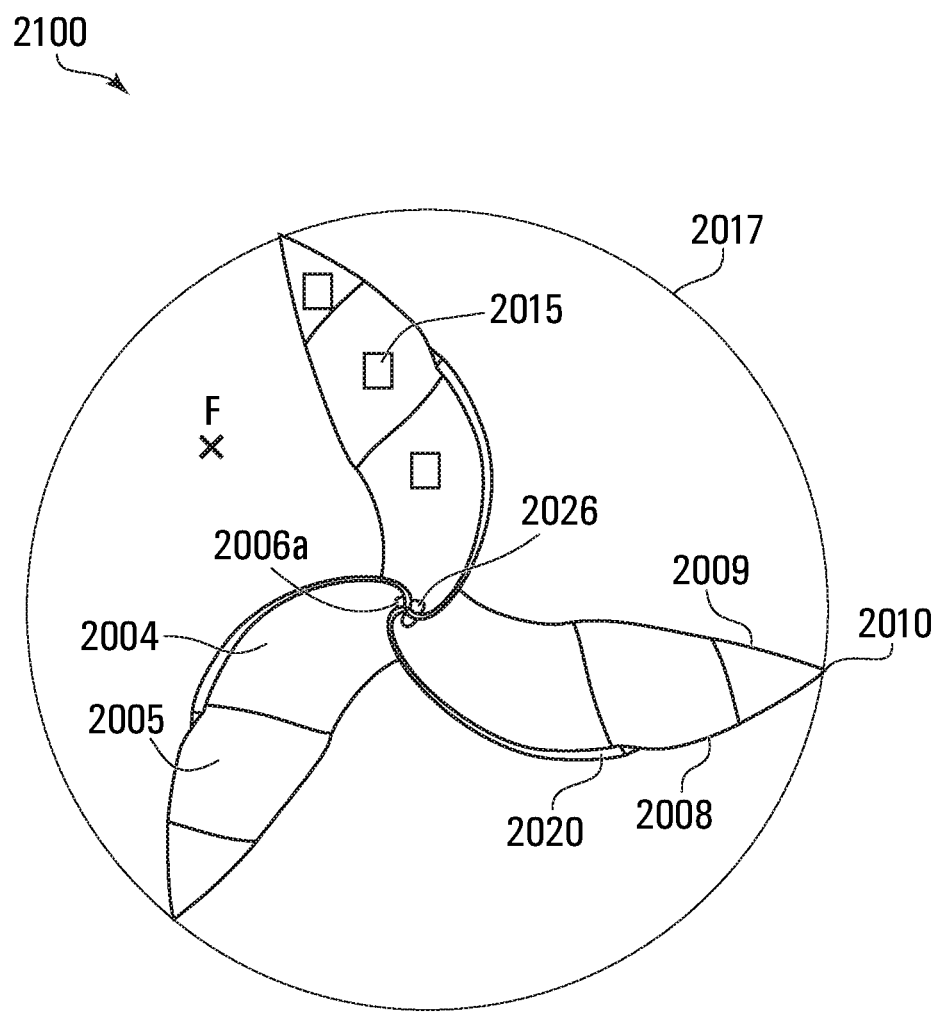
Figure 23:
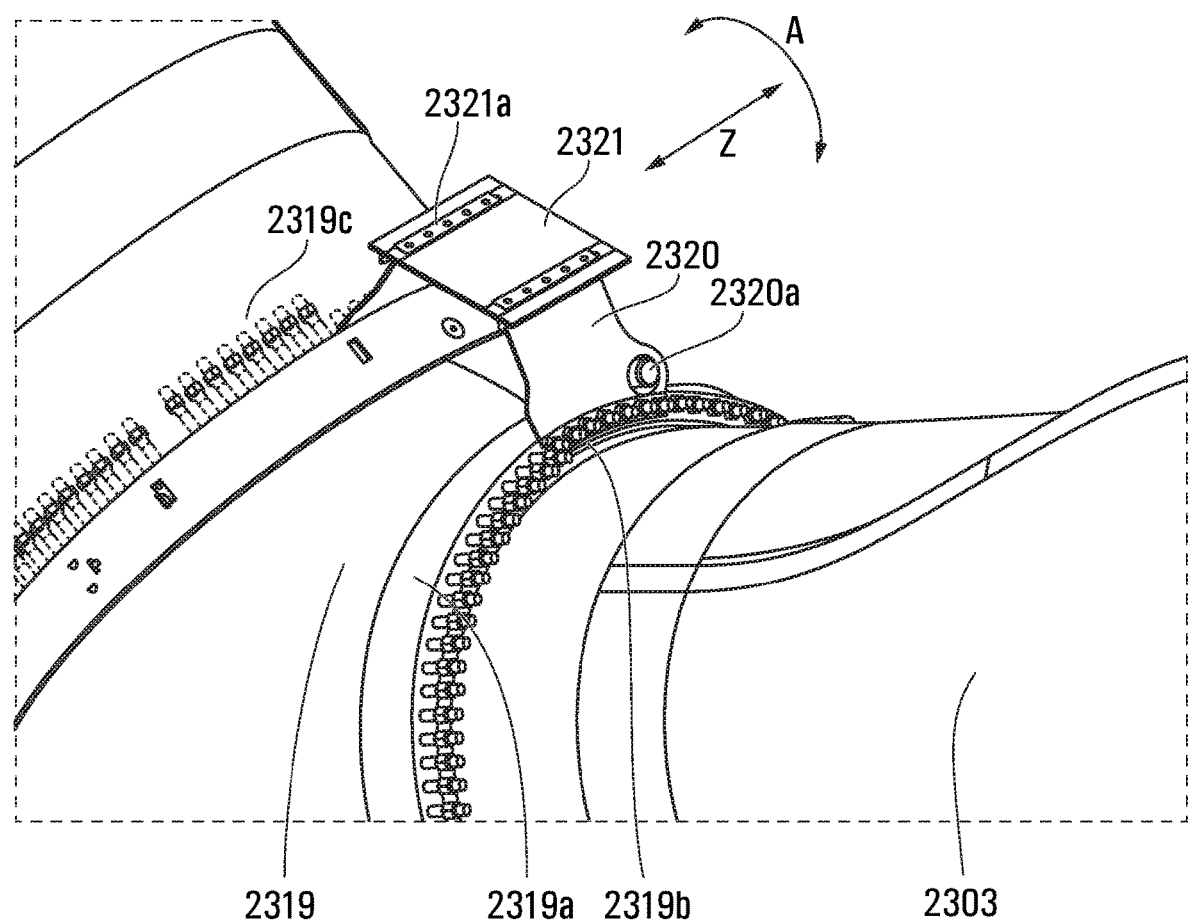
Figure 24:
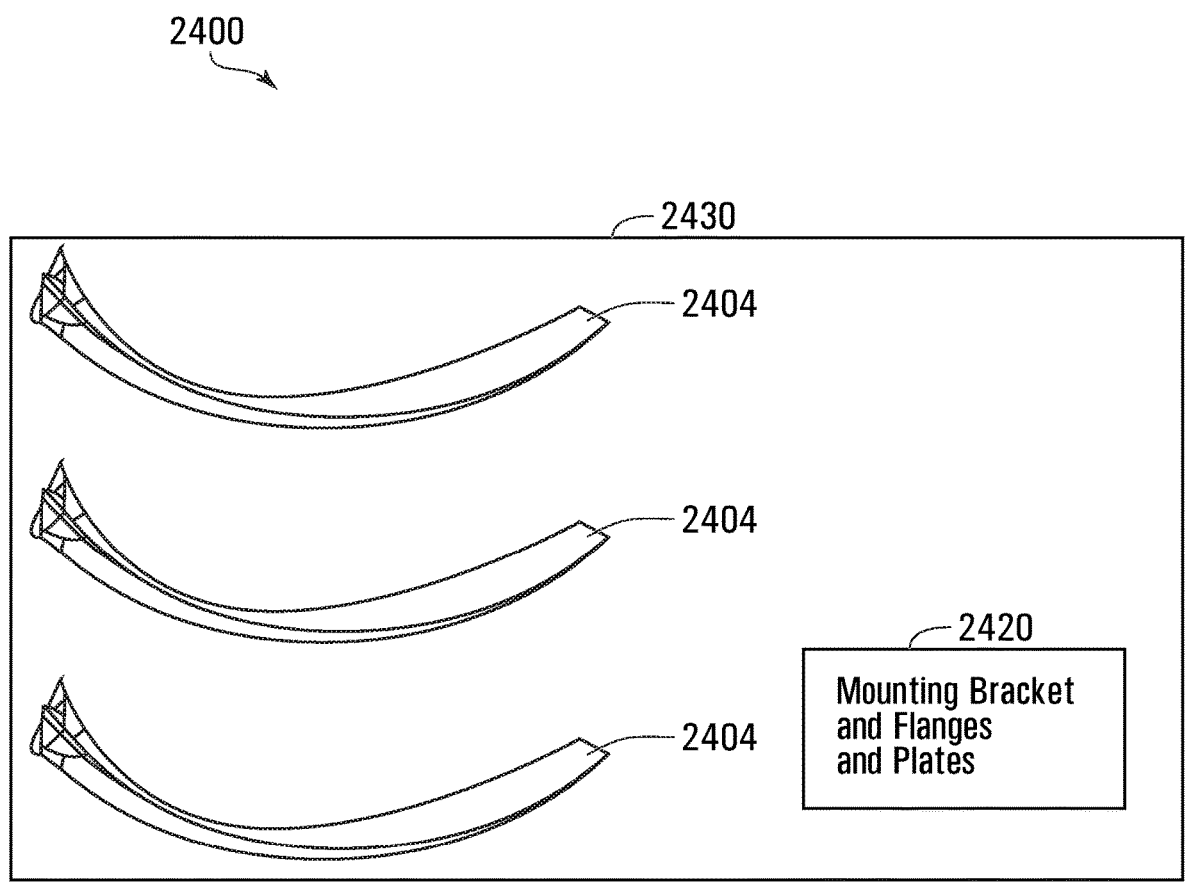
Figure 25:
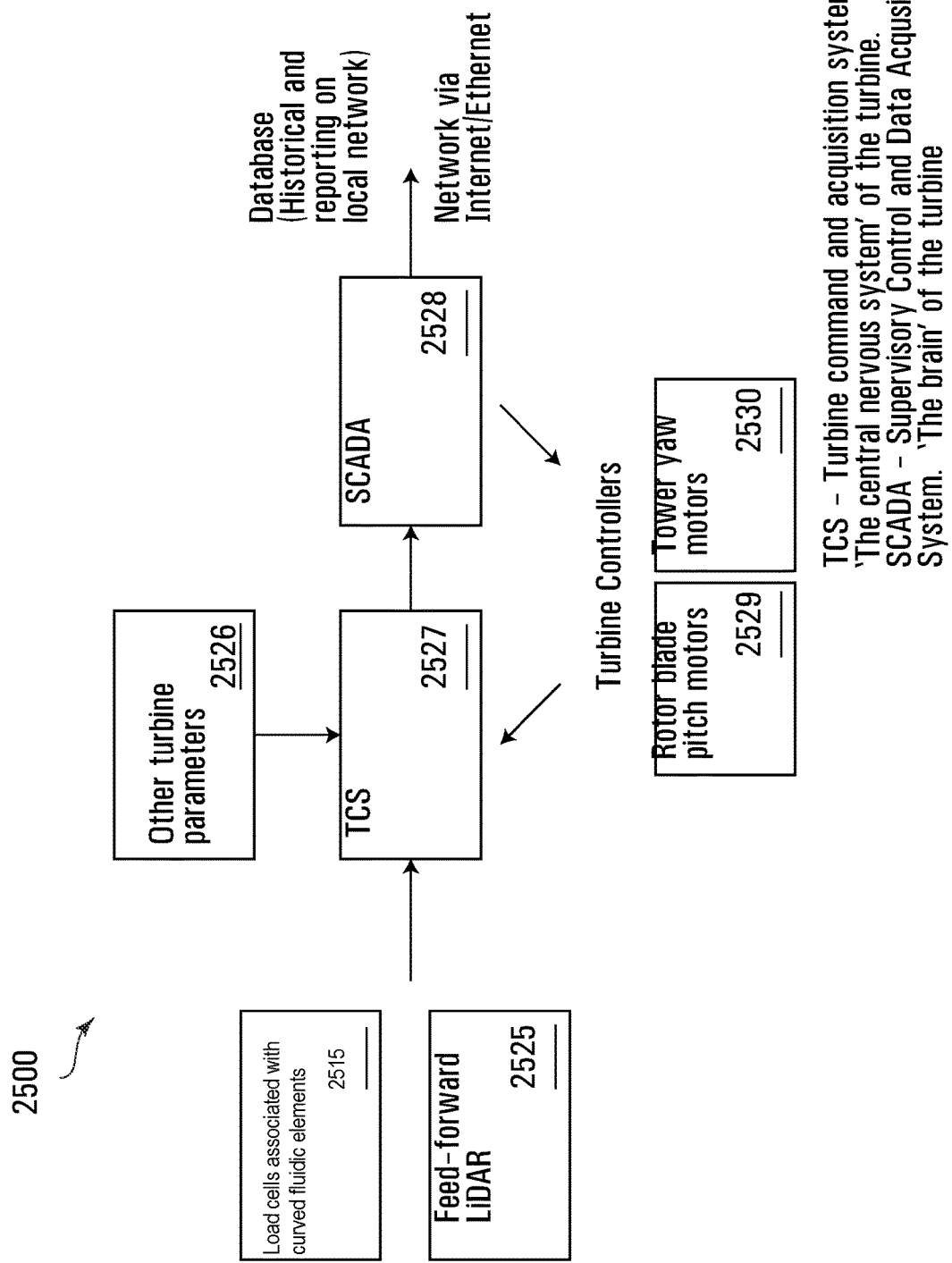
Figure 26:
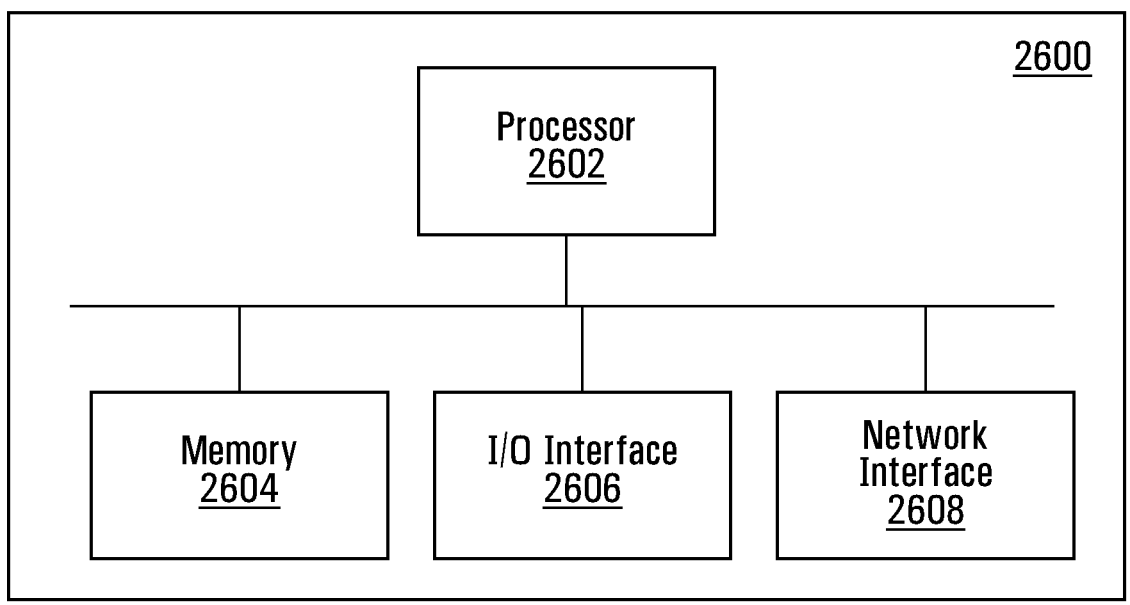
Figure 27:
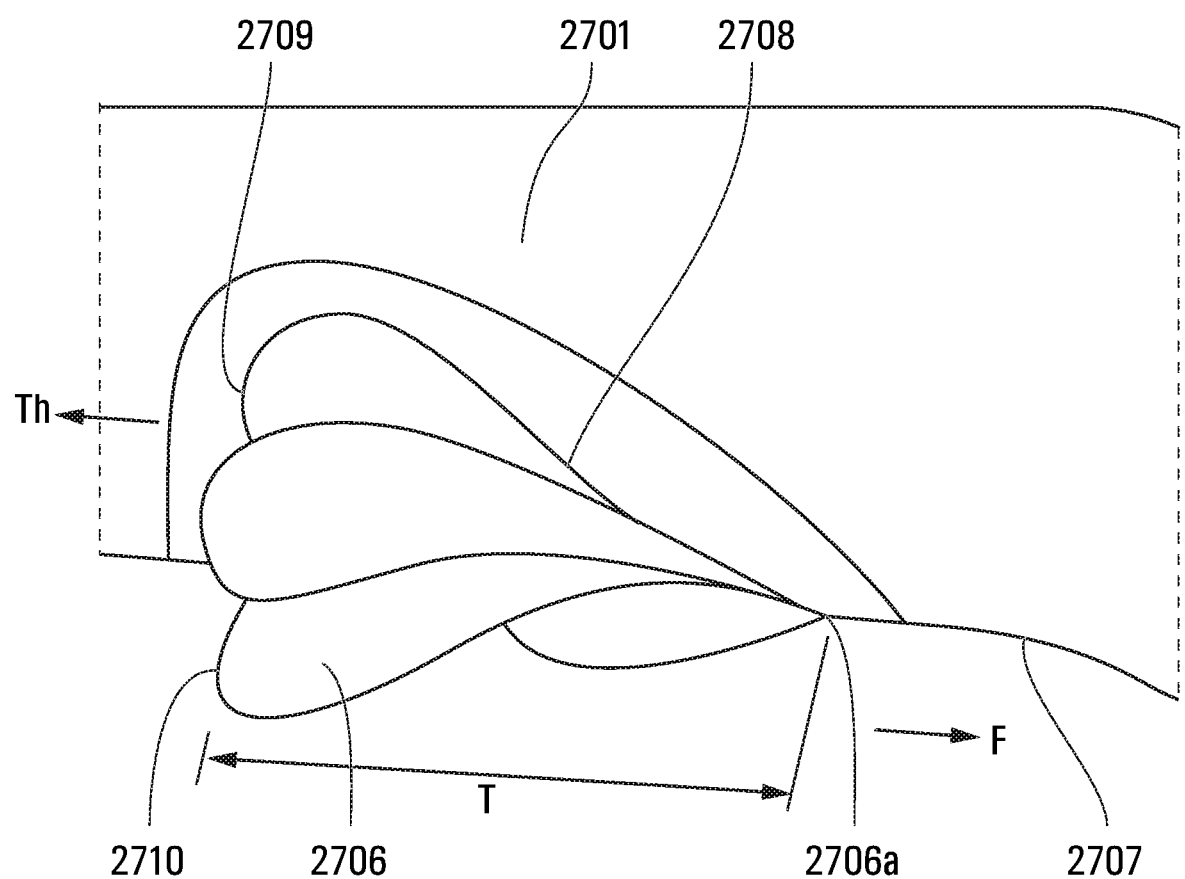

Embodiments of the invention will now be described with reference to the appended drawings in which:

FIG. 1 is a side elevation view of a horizontal axis wind turbine, according to the prior art;

FIG. 2A is a side elevation view of a horizontal axis wind turbine incorporating a fluidic structure in accordance with an embodiment of the invention;

FIG. 2B is a front perspective view of the horizontal axis wind turbine of FIG. 2A;

FIG. 3A is a side elevation view of a fluidic structure according to an embodiment of the invention;

FIG. 3B is a front elevation view of the fluidic structure of FIG. 3A;

FIGS. 4A and 4B are cross-sectional views of the fluidic structure of FIG. 3A, from a position proximate the upstream end (4A) and from a position closer to the downstream end (4B);

FIGS. 5A, 5B, 5C and 5D are cross-sectional views of various alternative embodiments of retention structures at edges of troughs;

FIG. 6 is a front perspective view of an attachment structure for the fluidic structure of FIG. 3A interfacing with a hub structure of a wind turbine;

FIG. 7 is a rear perspective view of an alternative attachment structure;

FIG. 8 is a rear perspective view of another alternative attachment structure;

FIG. 9 is a side elevation view of the fluidic structure of FIG. 8, further showing an attachment system and the relationship between the fluidic structure and a spinner, hub structure, and rotor blades of a turbine;

FIG. 10 is a front elevation view of a fluidic structure having surface texture according to an embodiment;

FIG. 11 is a front elevation view of a fluidic structure according to an embodiment having trough ends that terminate flush with respective rotor blades;

FIG. 12 is a side elevation view of an alternative fluidic structure according to an alternative embodiment of the invention;

FIG. 13 is a side elevation view of the fluidic structure of FIG. 12, further showing ventilation structure and the relationship between the fluidic structure and a spinner and hub structure of a turbine;

FIG. 14 is a front perspective view of a fluidic structure having troughs that are aerodynamic in cross-section, according to an embodiment;

FIG. 15 is a front elevation view of an urban wind turbine incorporating a fluidic structure;

FIG. 16 is a front elevation view of a turbine assembly incorporating a fluidic structure, according to some embodiments;

FIG. 17 is a side elevation view of a turbine assembly incorporating a fluidic structure, according to some embodiments;

FIG. 18 is a front elevation view of a fluidic structure, according to some embodiments;

FIG. 19 is a side elevation view of a fluidic structure, according to some embodiments;

FIG. 20 is a side elevation view of a turbine assembly incorporating a hydrodynamic fluidic structure, according to some embodiments;

FIG. 21 is a side elevation view of a hydrodynamic fluidic structure, according to some embodiments;

FIG. 22 is a front elevation view of a fluidic structure illustrating load cells disposed thereof, according to some embodiments;

FIG. 23 is a perspective view of a hub for mounting the fluidic structure, according to some embodiments;

FIG. 24 is a side elevation view of a shipping container storing a fluidic structure for transport, according to some embodiments;

FIG. 25 is a block schematic diagram of a turbine controller, according to some embodiments;

FIG. 26 is a block diagram of a computing device, according to some embodiments; and FIG. 27 is a side elevation view of a propeller for a ship, according to some embodiments.

DETAILED DESCRIPTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

FIG. 1 is a side elevation view of a horizontal axis wind turbine 10, according to the prior art. Wind turbine 10 includes a tower 100 supported by and extending from a surface S, such as a ground surface. Supported by tower 100, in turn, is a nacelle 200 extending horizontally. A hub structure with a spinner 300 is rotatably mounted at a front end of nacelle 200 and is rotatable with respect to nacelle 200 about a rotation axis R. Spinner 300 receives and supports multiple rotor blades 400 that each extend outwardly from spinner 300. Rotor blades 400 catch incident wind W; flowing towards the wind turbine 10 and are caused to rotate. Due to their being supported by spinner 300, rotor blades 400 when rotating cause spinner 300 to rotate about rotation axis R thereby to cause rotational motion that can be converted in a well-known manner into usable electrical or mechanical power. In this sense, rotor blades 400 are each structures adapted to traverse a fluid environment, where the fluid in this embodiment is ambient air. Nacelle 200 may be rotatably mounted to tower 100 such that nacelle 200 can rotate about a substantially vertical axis (not shown) with respect to tower 100, thereby to enable rotor blades 400 to adaptively face the direction from which incident wind W; is approaching wind turbine 10. A nose cone 500 of generally a uniform paraboloidal shape is shown mounted to a front end of spinner 300 to deflect incident wind W; away from spinner 300.

FIG. 2A is a side elevation view of a horizontal axis wind turbine 15 incorporating a fluidic structure 600 in accordance with an embodiment of the invention, and FIG. 2B is a front perspective view of horizontal axis wind turbine 15.

Wind turbine 15 includes a tower 100 supported by and extending from a surface S, such as a ground surface. Supported by tower 100, in turn, is a nacelle 200 extending horizontally. A hub structure with a spinner 300 is rotatably mounted at a front end of nacelle 200 and is rotatable with respect to nacelle 200 about a rotation axis R. Spinner 300 receives and supports multiple rotor blades 400 that each extend outwardly from spinner 300. Rotor blades 400 catch incident wind W; flowing towards the wind turbine 15 and are caused to rotate. Due to their being supported by spinner 300, rotor blades 400 when rotating cause spinner 300 to rotate about rotation axis R thereby to cause rotational motion that can be converted in a well-known manner into usable electrical or mechanical power. Nacelle 200 may be rotatably mounted to tower 100 such that nacelle 200 can rotate about a substantially vertical axis (yaw axis, not shown) with respect to tower 100, thereby to enable rotor blades 400 to adaptively face the direction from which incident wind $W_i$ is approaching wind turbine 15.

In this embodiment, fluidic structure 600 is shown mounted to a front end of spinner 300 and is rotatable, along with spinner 300 and rotor blades 400, about rotational axis R.

FIG. 3A is a side elevation view of fluidic structure 600, enlarged for ease of explanation, and FIG. 3B is a front elevation view of fluidic structure 600. Fluidic structure 600 includes a rigid body 602 having an upstream end 602U and a downstream end 602D. The rigid body 602 incorporates a plurality of troughs, in this embodiment three (3) troughs 604A, 604B and 604C. Each trough 604A, 604B and 604C is spiralled from a tip 606 at upstream end 602U to the downstream end 602D about rotational axis R. The troughs 604A, 604B and 604C are also each splayed with respect to the rotational axis R thereby to, proximate the downstream end 602D, direct incident fluid—in this embodiment incident wind $W_i$—along the troughs 604A, 604B and 604C in a direction substantially normal to the axis of rotation R.

In this embodiment, the troughs 604A, 604B and 604C at the upstream end 602U generally come from a point proximate to tip 606 along a direction generally parallel to the rotational axis R and then, as they progress in spiral towards the downstream end 602D splay outwards progressively away from the rotational axis thereby to re-direct incident wind $W_i$ (shown going into the page in FIG. 3B) so that the re-directed wind $W_{RD}$ flows along the front surface of rotor blades 400.

As shown particularly in FIG. 3B, each of troughs 604A, 604B and 604C is generally a single-stage format i.e., is progressively gradually increased in focal radius of the spiral from the upstream end 602U to the downstream end 602D. Furthermore, there is a corresponding gradual increase in the width of the trough from upstream end 602U to downstream end 602D. In this embodiment, each of troughs 604A, 604B and 604C is widened generally parabolically, such that there is a gradual increase in the width of the trough from upstream end 602U to downstream end 602D. In alternative embodiments, the troughs may be contoured so as to, when going from upstream end 602U to downstream end 602D, gradually increase in width, then maintain a steady width through an intermediate region such that the edges of the trough run parallel, then gradually increase in width again to the downstream end 602D. In yet another alternative embodiment, the troughs may be contoured so as to, when going from upstream end 602U to downstream end 602D, gradually increase in width, then maintain a steady width through a downstream region until the downstream end 602D without increasing again in width.

FIGS. 4A and 4B are cross-sectional views of fluidic structure 600, from a position A proximate the upstream end (shown from A in FIG. 3A) and from a position closer to the downstream end (shown from B in FIG. 3A), showing the different focal radii FR_A and FR_B of the troughs 604A, 604B and 604C, as well as the different widths of the troughs 604A, 604B and 604C. It will be noted that, in this embodiment, the width of each trough 604A, 604B and 604C progresses proportionally with the focal radius.

As shown in FIGS. 3A, 3B, 4A and 4B, each trough 604A, 604B and 604C has opposite edges extending from the upstream end 602U to the downstream end 602D. In this embodiment, one of the edges of each trough 604A, 604B and 604C incorporates respective retention structure 605A, 605B and 605C for inhibiting incident fluid—in this embodiment incident wind—from exiting a respective trough 604A, 604B and 604C and for directing the incident fluid along the trough.

In this embodiment, each retention structure 605A, 605B and 605C is an arced elongate wall that is generally a C-shape in cross section. In particular, a portion of surface of each trough 604A, 604B and 604C that faces incident wind Wi along the edge is gradually bent on itself to a maximum angle of two hundred and seventy (270) degrees. The cross-section of the troughs 127 may further be of any beneficial elliptical or bowed shape.

Figures 5A, 5B, 5C, 5D:
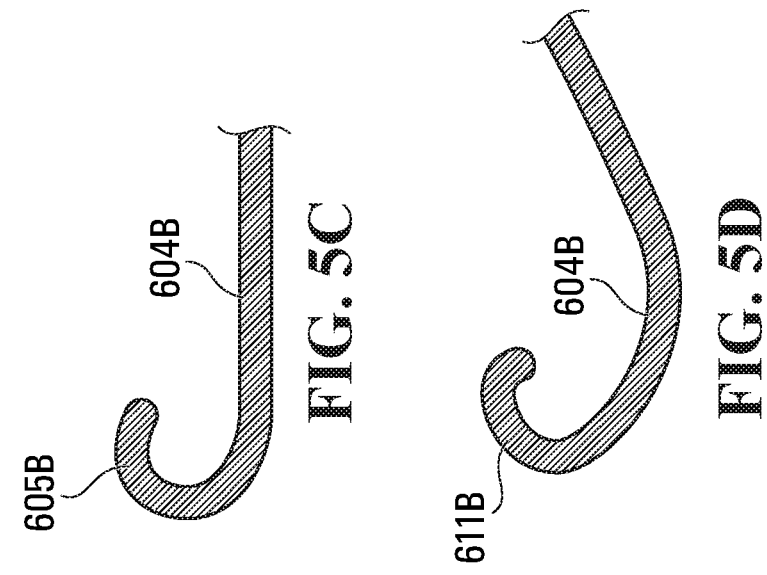

FIGS. 5A, 5B, 5C and 5D are cross-sectional views of various alternative embodiments of retention structures for a trough such as trough 604B, along a portion of its edge. For example, FIG. 5A is a view of a retention structure 607B that is a very-slightly arced wall the extends generally 90 degrees in an upstream direction, FIG. 5B is a view of a retention structure 609B that is a slightly arced wall with a wider radius than that of FIG. 5A and that dips slightly in a downstream direction prior to arcing in an upstream direction, FIG. 5C is a view of retention structure 605B of fluidic structure 600 as shown in FIG. 4B that extends generally 90 degrees in an upstream direction before curving, and FIG. 5D is a view of a retention structure 611B that is similar to retention structure 605B but that, like retention structure 605B, dips slightly in a downstream direction prior to arcing upstream again. In still further embodiments, the retention structure may be extended in its generally C-shape so as to be generally U-shaped in cross-section.

The retention structures inhibit incident wind Wi from spilling over the edge of the troughs thereby to keeps more wind within the troughs in the regions at which the retention structures extend from the edges.

FIG. 6 is a front perspective view of an attachment structure, in the form of a nose clamp assembly 650, for interfacing the fluidic structure 600 with a hub structure of a horizontal-axis wind turbine, such as wind turbine 15. Nose clamp assembly 650 is configured such that the existing hub structure 300 and rotor blades 400 do not need to be disassembled in order to retrofit wind turbine 15 with fluidic structure 600 using nose clamp assembly 650. As shown, nose clamp assembly 650 is attached onto the existing hub structure 300 of the wind turbine 15 and is further stabilized to the roots 402 of the rotor blade 400 through support devices of nose clamp assembly 650 including brackets 656, clamps 652, and rollers and/or castors 654. Alternatively, one or more clamps, one or more braces, one or more brackets, one or more struts, one or more castors, and one or more rollers, or combinations thereof may be employed as attachment mechanisms.

It will be noted that preferably the rollers and/or castors 654 are interfaced with the fluidic structure 600 and the turbine 15 to enable nose clamp assembly 650 to accommodate selective adjustments to the pitch of each rotor blade 400 with respect to the hub structure. In this case, the rollers roll along the outer surface of the root 402 of a respective rotor blade 400, while retaining fluidic structure 600 in a central position with respect to the hub structure.

FIG. 7 is a rear perspective view of an alternative attachment structure, in the form of a nose clamp assembly 660, for attaching the fluidic structure 600 to only the roots 402 of rotor blades 400 of horizontal-axis wind turbine 15. In this embodiment, the existing spinner 300 and rotor blades 500 do not have to be removed prior to wind turbine 15 being retrofitted with fluidic structure 600. As shown, nose clamp assembly 660 is stabilized to the roots 402 of the rotor blade 400 through support devices of nose clamp assembly 660 including brackets 656, clamps 652, and rollers and/or castors 654. Alternatively, one or more clamps, one or more braces, one or more brackets, one or more struts, one or more castors, and one or more rollers, or combinations thereof may be employed as attachment mechanisms.

It will be noted that preferably the rollers and/or castors 654 are interfaced with the fluidic structure 600 and the turbine 15 to enable nose clamp assembly 660 to accommodate selective adjustments to the pitch of each rotor blade 400 with respect to the hub structure. In this case, the rollers roll along the outer surface of the root 402 of a respective rotor blade 400, while retaining fluidic structure 600 in a central position with respect to the hub structure and the tip 606 in line with the axis of rotation R.

In an alternative embodiment, the attachment system may be configured to interface only with the hub structure of a wind turbine, and thereby not physically contact its rotor blades.

FIG. 8 is a rear perspective view of an alternative fluidic structure 700. Fluidic structure 700 is similar to fluidic structure 600, in that fluidic structure 700 includes a rigid body 702 having an upstream end 702U and a downstream end 702D. The rigid body 702 incorporates a plurality of troughs, in this embodiment three (3) troughs 704A, 704B and 704C. Each trough 704A, 704B and 704C is spiralled from a tip 706 at upstream end 702U to the downstream end 702D about rotational axis R. The troughs 704A, 704B and 704C are also each splayed with respect to the rotational axis R thereby to, proximate the downstream end 702D, direct incident fluid—in this embodiment incident wind $W_i$— along the troughs 704A, 704B and 704C in a direction substantially normal to the axis of rotation R.

In this embodiment, fluidic structure 700 includes integral circular loops 740A, 740B and 740C affixed to the rear-facing side of fluidic structure 700 and each dimensioned to receive and seat a respective root 402 of a rotor blade 400 (not shown in FIG. 8) prior to the roots 402 interfacing with a hub structure of a turbine such as wind turbine 15. The integral circular loops 740A, 740B and 740C are shown without any rollers simply for clarity.

FIG. 9 is a side elevation view of fluidic structure 700, further showing the hub structure 670 and its relationship between the fluidic structure 700 and a spinner 300 of the hub structure, and rotor blades 400 of a wind turbine 15. Hub structure and integral circulate loops 740A, 740B and 740C may be used to "bolt" fluidic structure 700 onto the hub structure of the wind turbine 15 thereby to retrofit wind turbine 15 with a fluidic structure, and interfaces with struts 675 that may have been part of an original nose cone 500 and/or spinner 300.

FIG. 10 is a front elevation view of a fluidic structure 800 having surface texture 855 on one of the troughs 804B and showing an intended orientation of clockwise spin. The other troughs 804A and 804C may have similar surface texture 855. Fluid-directing structure 800 may be configured very similarly to fluid-directing structures 600 and 700 and, in this embodiment, is shown terminating at the downstream end such that its troughs 804A, 804B and 804C are integrated with respective rotor blades 400 thereby to provide a continuous front surface for receiving and redirecting incident wind Wi in the directions shown by $W_{RD}$. The continuous front surface reduces interruptions in fluid flow that could otherwise contribute to undesirable fluid drag.

The texture 855 may be of any configuration that reduces fluid drag and therefore permits increased power production of the fluidic structure 800. For example, texture may include dimples. A close-up view of texture 855 can be seen at 860 which shows dimples 861 that sink beneath the surface of the trough and dimples 862 that rise above the surface. The side elevation enlarged sub figure of FIG. 10 shown at 863 illustrates the excavations of dimples 861 and their rise above the surface 862.

In an embodiment, there may also be included vortex generators on the surface of the nose cone assembly. The application of the surface texture may be done by any means during manufacture or after installation.

FIG. 11 is a front elevation view of fluidic structure 800 with the surface texture 855 not shown and showing an intended orientation of counter-clockwise spin.

It will be appreciated that the direction in which the troughs 804A, 804B and 804C are spiralled with respect to the axis of rotation R corresponds with the opposite direction in which the rotor blades 400 are intended to turn. As such, a counterclockwise direction of intended rotation for the rotor blade(s) would coordinate with a clockwise spiral for the troughs 804A, 804B and 804C about the axis of rotation R (into the page as shown in FIG. 11), whereas a clockwise direction of intended rotation for the rotor blade(s) would coordinate with a counterclockwise spiral for the 804A, 804B and 804C about the axis of rotation as in FIG. 10. In this embodiment, the troughs 804A, 804B and 804C of fluidic structure 800, where they respectively become aligned with an upwind power-producing aerofoil portion of a respective rotor blade 400, may take on the cross-sectional shape of an aerofoil. Alternatively or in some combination the troughs 804A, 804B and 804C may form a new leading edge section of the rotor blades 400 and/or may form a new trailing edge section of the rotor blades 400.

FIG. 12 is a side elevation view of an alternative fluidic structure 900. In this embodiment, fluidic structure 900 has troughs 904A, 904B and 904C that each have a first stage S1 progressively widened from the tip 906 at its upstream end 902U to a midpoint position P that is intermediate the upstream end 902U and the downstream end 902D. Each of troughs 904A, 904B and 904C also includes a second stage S2 progressively widened from the midpoint position P to the downstream end 902D. Each trough 904A, 904B and 904C in its second stage S1 is generally wider than in its first stage S2.

Each of stages S1 and S2 generally progressively widens parabolically in shape. In this embodiment, midpoint position P is halfway between the upstream and downstream ends. However, in alternative embodiments the midpoint position P may be more that halfway between the upstream and downstream ends, such as at the three-quarters (¾) position. Furthermore, troughs 904A, 904B and 904C may spiral around the rotational axis R between about one hundred and eighty (180) degrees and about three hundred and sixty (360) degrees. The contour of the spiral may go through many deviations. For example, the spiral of a trough may begin at the front tip 906 of the nose cone and continue through to the downstream end 902D where its surface connects flush and/or comes into close proximity with the upwind power producing aerofoil portion of a corresponding rotor blade 400. In embodiments, the spiral may traverse any paraboloidal shape or multitudes thereof so as to have more than two stages. After beginning at the tip 906, a parabolic contour may then taper at a position near the midpoint position P to reach a near-parallel line with the rotational axis R. At this position near the midpoint position P, a parabolic contour may then splay to a wider focal, of which half, or ninety (90) degrees of its turn is completed. The contour may then taper again near the hub structure to be parallel with the line of the drive shaft, at which point a full one hundred and eighty (180) degrees of the turn will be completed. This configuration thus allows incident wind Wi to proceed in a step-wise fashion over the multiple stages S1, S2 along the surface of a respective trough 904A, 904B, 904C, as inspired by the beak and head of a kingfisher, and be directed onto the upwind power producing aerofoil portion of the corresponding rotor blade 400.

FIG. 13 is a side elevation view of fluidic structure 900, further showing ventilation structure and the relationship between the fluidic structure and a spinner and hub structure 120 of a turbine. The ventilation structure includes ventilation inlets 985, flexible tubes and/or hoses 986, along with the relative inner positions of the existing hub structure 120 and nosecone 500. In this embodiment, the fluidic structure 900 may include ventilation inlets 985 on its surface within the second stage S2 to allow air to penetrate into the nosecone 500 and hub structure 120 and/or nacelle 200 via flexible tubes and/or hoses 986.

According to an aspect of another embodiment, the fluid-redirection structure 900 may be a monocoque assembly with a structural skin, and that is configured to enable an existing hub structure 120 with spinner 300 and/or nosecone 500 to be received at the downstream end 902D within the fluidic structure 900. In this embodiment, the fluidic structure is a one-piece unit. In alternative embodiments, the fluidic structure may be a multi-piece unit.

FIG. 14 is a front perspective view of a fluidic structure 1000 having troughs 1004A, 1004B and 1004C that are aerodynamic in cross-section, along with added aerodynamic aerofoil sections 1046.

According to this aspect, this may be achieved by having a gap 1043 between the outermost portion of the downstream end 1002D of the fluidic structure 1000 and an upwind power producing aerofoil portion of the wind turbine rotor blade(s) 400. This method covers the root(s) region of the rotor blade(s) 402, but allows for the flexibility of the material and/or the ability to convert the outermost portion of the downstream end 1002D of the fluidic structure 1000 into an aerofoil section. This effectively extends the length of the rotor blade(s) 400, creating new leading 404 and trailing 405 edges. Furthermore, another aerodynamic aerofoil section 1046 may be added in a position parallel to the rotor blade(s) 400, and slightly above the outermost portion of the downstream end 1002D of the fluidic structure 1000. This has the effect of preventing any remaining kinetic energy in the wind incident Wi from exiting the outermost portion of the downstream end 1002D of the fluidic structure 1000 between the root(s) of the rotor blade(s) 402 without first doing work on the fluidic structure 1000 before hand. The work is shown here at Wii, where the wind incident is made to divert its path along an aerodynamic aerofoil section 1046, thus doing work on that section and reducing its kinetic energy, exiting out at We. This aerodynamic aerofoil section 1046 is attached to the rear portion of the troughs at 1005A and a front portion 1005B of the outermost portion of the downstream end 1002D of the fluidic structure 1000 through any suitable method, such that a rotational force is generated when wind incident Wi passes over it. According to another aspect, this section 1046—along with any other section of the fluidic structure 1000—may form a combination of two (2) or more detachable sections.

Betz Limit Considerations and Improvements Thereof

As stated above, the Betz limit is the maximum coefficient of performance (Cp) in wind kinetic energy extraction, and is 59.3%. Known wind technologies have in reality a much lower Cp than the Betz limit. The equation for the Betz limit is the following:

$$P_{max} = 16/27 \times 1/2 \times p \times S \times v_1^3$$

where, Pmax is the maximum power available, p is the density of the air, S is the swept area of the rotor and v is the velocity of the air.

The Coefficient of performance can also be determined by examining the axial induction factor of the turbine (a), which is described by the following relation:

$$C_p = 4a(1-a)^2$$

and which achieves the Betz Limit when a=⅓.

The Betz law assumes that:

1. The rotor does not possess a hub, this is an ideal rotor, with an infinite number of blades which have no drag. Any resulting drag would only lower this idealized value.
2. The flow into and out of the rotor is axial. This is a control volume analysis, and to construct a solution the control volume must contain all flow going in and out, failure to account for that flow would violate the conservation equations.
3. The flow is incompressible. Density remains constant, and there is no heat transfer.
4. Uniform thrust over the disc or rotor area.

The above is an idealized maximum which is never reached, as modern turbines possess a hub and their rotor is not ideal. However, in theory it is possible to extend this limit by breaking the 4th assumption, that the thrust over the rotor area is uniform. By concentrating flow towards outer radial positions, an improved approach can exceed the power capture potential for a given flow state. The embodiments in this application describe one such device that can break this assumption, by channeling incoming flow away from the center axis of rotation.

In so doing, a new equation is provided below to describe the phenomena, which can help to predict possible outcomes.

$$C_{pPC} = \frac{Vr_{base}}{Vr_{PC(ave)}^{\left(\frac{Vr_{root}}{Vr_{tip}}\right)}} \cdot C_{pbase}$$

FIG. 16 is a front elevation view of a wind turbine assembly incorporating a fluidic structure (e.g., an aerodynamic nosecone), according to some embodiments.

FIG. 16 illustrates a wind turbine 1600 with tower 1601, nacelle 1602 and pitchable blades 1603, which together define a rotor.

The nacelle 1602 houses the main shaft and drive train of the wind turbine and a power converter, e.g. a generator, which is caused to spin through the torque of a main shaft, which defines the axis of rotation about the location 1606a with respect to the rotor 1603.

Torque to the main shaft is provided by the pitchable blades 1603, which itself is comprised of a number of optimized aerofoil sections whose geometry it based on radial position, which is defined in the prior art, and uses the aerodynamic principle of lift to generate the force of torque about the location 1606a.

More specifically, the pressure differential between the two sides of a pitchable blade 1603 of a wind turbine 1600, known as 'pressure' and 'suction' side, generate the torque on a main shaft, as that pressure tries to equalize and causes rotation of the rotor.

In some embodiments, the aerofoil sections of a pitchable blade 1603 progressively widen in their chord length, which is to say the blade becomes progressively wider, from a blade tip 1603a to the maximum chord width position 1603b, which is commonly 80% of the blade's total length.

The rotor contains pitchable blades 1603 to maintain an optimal angle of attack for the various aerofoil section geometries, given their radial position, and thus their local velocity during operation. From the region of maximum chord width 1603b to the end of the rotor nearest the axis of rotation 1606a, a rotor blade root 1604 is defined.

This blade root 1604 is engineered for structural purposes to support the weight of the pitchable blade 1603, and thus is generally circular in its cross section, which doubly allows for the act of pitching via a pitch motor. As such, this blade root 1604 is sub-optimal aerodynamically, and decreases the overall efficiency potential of the wind turbine 1600 due to its promotion of stall and turbulence in operation, not being an optimized aerofoil section.

One of the causes for the creation of turbulence and stall in section 1604 is that there is not enough energy in the wind to stay attached to the pitchable blade 1603 in the severe direction changes that are created due to the rotor blade's geometry, being more circular, and as such the flow separates off of the surface of the blade root 1604, creating turbulence and stall.

The blade root 1604 contains cross-sections that are more aerofoil-like in nature nearest the maximum chord length position 1603b, and also contains cross-sections that are less aerofoil-like in nature nearest the axis of rotation 1606a. As such, sections of the blade root 1604 nearest the axis of rotation 1606a are more likely to stall and create turbulence, and the degree of stall and turbulence created is more likely to be higher in those sections, as compared to cross-sections nearer 1603b. In one embodiment of this application, an aerodynamic nosecone 1606 for a wind turbine 1600 is described.

One of the functions of this aerodynamic nosecone 1606 is to promote and aid preferential aerodynamics for the pitchable blade 1603 corresponding to the blade root 1604, which is currently sub-optimal and prone to turbulence and stall. During operation, turbulence and stall impart undesired vibrations in the drive train contained within the nacelle 1602, and lead to costly maintenance and premature component replacement. Rotor blades 1603 are also components that are prone to premature replacement, so it would be further desirable to reduce vibrations and un-necessary loading caused by turbulence and stall on this component, along with the tower 1601.

In operation, wind flowing over the three pitchable blades 1603 causes the rotor to turn through the aerodynamic mechanism of lift. These blades are attached to a main shaft through a hub, located upwind from a nacelle 1602, which is connected to a generator that creates electricity.

FIG. 17 is a side elevation view of a wind turbine assembly incorporating a fluidic structure, according to some embodiments.

During the operation of a wind turbine 1600, a phenomena known as 'rotor root leakage' is also known to occur, whereby a low pressure region around the rotor blade root 1604 is formed due to sub-optimal aerodynamics. In further radial positions of the pitchable blade 1603 nearer the tip 1603a, areas of high pressure are known to exist. The difference in pressure between these areas cause a slight radial movement of air from the high pressure region to the low pressure region, accelerating the incident fluid 'F' coming into the face of the rotor towards the axis of rotation 1606a.

The maximum power available to any wind turbine 1600 is described by the Betz Limit, and is in part a function of the length of the pitchable blade 1603, which thus describes the swept area of the rotor. One assumption of this limit is that the flow is uniform across the rotor disk, which in practice is not the case, due in part to the rotor root leakage phenomena. The inverse is also true, meaning that if flow is concentrated towards further radial positions 'Fi', than the limit in theory can be eclipsed. This is described in an earlier equation.

In another embodiment, the aerodynamic nosecone 1606 promotes preferential aerodynamics in accordance with the above equation, by creating an area of high pressure, where before there was an area of low pressure in its local area (e.g., within 25 meters). Due in part to its geometry, beginning with the tip of the aerodynamic nosecone 1606a the incident fluid 'F' is channeled towards outer radial positions, 'Fi'.

In a further embodiment, this occurs at first through a drag-based mechanism, and then secondly through a lift-based mechanism, which is described in further detail in FIG. 19.

The local effect is that it draws the incident fluid 'F' to take on the flow pattern seen in 'Fi', meaning more fluid flows over aerofoil sections that are better able to convert this flow into torque at a main shaft at further radial positions.

According to another embodiment, this evens out the pressure distribution across the rotor disk, and reduces loads on the wind turbine 1600, especially the tower 1601.

FIG. 18 is a front elevation view of a fluidic structure adapted to operate in wind, according to some embodiments. Example dimensions include approximately a third of the fluidic structure being drag-based, while approximately two third of the structure being lift based, +/−15%. In this example, the point from the center axis to 1809 is ⅓ the length of the whole blade.

In an embodiment, there is described a fluidic structure 1806 having curved fluidic elements 1804, 1805, that begins at an upstream tip 1806a in line with a center axis, and extend to a downstream end 1810, and rotates about that center axis in the direction 'R', such that each curved fluidic element 1804, 1805 has a leading edge 1808 and a trailing edge 1809. The curved fluidic element 1804 that is closer to the upstream tip 1806a operates more generally on the principle of drag, while the fluidic element 1805 operates more generally on the principle of lift, being composed of aerofoil sections. Both sections 1804 and 1805 generally progressively narrow in chord section and width from the upstream tip 1806a to the downstream end 1810.

In one embodiment of this application pertaining to the operation of a fluidic turbine such as wind turbine 1600, fluid 'F' flowing against fluidic elements 1804 and around the aerofoil sections of 1805 creates the force of rotation in the direction 'R', thereby contributing torque from the fluidic structure 1806 and, when coupled (e.g., bolted) to a fluidic turbine such as the wind turbine 1600, generates additional torque to the main shaft housed within the nacelle 1602.

In another embodiment of this application, the operation of a fluidic turbine such as a wind turbine 1600 is aided by the aerodynamic nosecone 1806 and contains an ultra-sonic noise inducer 1825 at the upstream tip 1806a specifically programmed to deter bats and other avian species from flying near the turbine by producing a noise that is not audible to humans.

As shown, some embodiments may be serpentine-shaped, as well as conical, or frusto-conical. The geometry can include continuous shapes that "spiral" outwards, and each fluidic element may be continuous structures that are discrete from one another and spaced apart from one another. The overall profile of the fluidic elements in combination may be conical, serpentine shaped, or frusto-conical.

From a scale perspective, in a non-limiting example embodiment, each fluidic structure is a blade of a nosecone that extends to approximately 20% (+/−5) of the blade length, which is about where max chord occurs on the blade. So a 50 meter blade length would, for example, have a 10 meter improved nosecone fluidic element blade length.

FIG. 19 is a side elevation view of a fluidic structure adapted to operate in wind, according to some embodiments.

As a fluid particle strikes the fluidic element 1804, its geometry deflects the fluid particle such that an equal and opposite reaction occurs, exhibiting a force in the direction of 'R', resulting in torque around a center axis of rotation 'A'.

The three fluidic elements 1804, 1805, join at 1806a, which describes the upstream tip and the central axis of rotation 'A'. In operation, the incident fluid 'F' passes down along the surface of 1804 to the pressure side 1805 of the fluidic element, whose cross section is defined by an appropriate aerofoil section 1811, joining flow that is striking this pressure side 1805 and that which is striking the leading edge 1808 of the aerofoil and contributing lift.

Due to the addition of flow from 1804 to the pressure side of 1805, the pressure differential between pressure side and suction of the aerofoil sections of 1805 is increased, and promotes increased aerodynamic effigies that are then harnessed by the fluidic structure 1806 and the resultant fluidic turbine that it is attached to, which as example could be a wind turbine as described in FIG. 16. This aerodynamic mechanism effectively accelerates the flow locally, and contributes to an energized boundary layer, contributing to the promotion of laminar flow off of the trailing edge 1809 of the fluidic structure 1806.

In one aspect of this embodiment, the geometry of the fluidic structure of 1806 also confers preferential structural stability, being closely triangular in shape, which in turns limits vibration of the fluidic structure 1806 that could be passed to the associated fluidic turbine 1600 by way of solid attachment points described later in this application, during in its operations.

In another embodiment of this application, there is given a sensor system that may contain at least one of a forward facing LiDAR unit 1826, suitable for determining environmental and turbine specific data, which can include RPM, rotor position, wind speed, wind turbulence, wind shear, wind veer, temperature, humidity, and air density among other variables, coupled to the tip of the fluidic structure 1806*a* that enables a feed-forward data stream to reduce unwanted loads and undesirable operational phenomena on the turbine's rotating components, namely the rotor 1603 and drive train, main shaft and generator contained within a nacelle 1602, and supporting structure including a tower 1601.

In one aspect of this embodiment, the use of a forward facing LiDAR unit 1826 coupled to a fluidic turbine such as 1600 through the attachment of a fluidic structure 1806 via a mechanism as described in FIG. 22 can improve the power performance and aerodynamic efficiency of an associated pitchable blade 1603 and turbine 1600 through anticipatory control procedures and defined operating approaches and thresholds, where the pitchable blade 1603 can be pitched to the desired angle of attack and a fluidic turbine's 1600 rotating components—namely the rotor 1603 and drive train, main shaft and generator contained within a nacelle 1602, can be yawed to the desired orientation against the reference of the incident fluid 'F'. These mechanical inputs are determined through a data architecture system described in FIG. 25.

In another embodiment of this application, the fluidic structure 1806 contains load cells 1815 directly physically associated with at least one of a curved fluidic element 1804, 1805 of a fluidic structure 1806 and transmit a near real-time data feed within 0.01-5 seconds through a data architecture system described in FIG. 25 to reduce unwanted loads and operational phenomena and improve power performance.

During operation, the load cells and associated data stream enable direct control of the fluidic turbine based on measured loads by adjusting a pitchable rotor blade 1603 through an associated pitch motor and/or adjusting a turbine's rotating components through a yaw motor, usually at the base of a nacelle 1602. An example load cell includes a strain gauge mechanism, which, in a non-limiting example, includes Wheatstone bridge type circuitry whose electrical properties are modified in response to physical deformation (e.g., elastic deformation). This type of example load cell could include linear conductive strips or resistive foil type circuitry whose strain levels can be detected through a measured response to an excitation voltage.

The difference in specific load as measured between load cells 1815*a* and 1815*b*, as example, in operation can inform turbine controller behaviour given knowledge about rotor position. Loads that are measured as different between 1805*a* and 1805*b*, along with the magnitude of the difference can inform the degree of alteration required of a pitchable blade 1603 and/or a turbine nacelle 1602 via its yaw motor to bring the turbine into line to a pre-defined operational load parameter. This system can be easily compatible with other systems that measure loads on pitchable blades 1603.

FIG. 20 is a side elevation view of a tidal turbine assembly that includes a tower 2001, drive train and generator enclosed with a water-tight nacelle 2002, that is acted upon by an associated hub 2013, that supports both hydrodynamic blades 2003 and a fluidic structure being a hydrodynamic nosecone 2000, composed generally curved fluidic elements each composed of a drag-based component 2004 and a lift-based component 2005, according to some embodiments of this application. In this figure, the fluid 'F' is water, which is exponentially more dense than the fluid of air. As such, the geometry of the hydrodynamic nosecone 2000 is different from that of earlier FIGS. 16-19.

The principle of Time-Dependent Energy Transfer (TDET) being maintained, the increase in density of the fluid causes an increase in the time 'T' needed to slow down the incident fluid 'F' according to one aspect of this invention, moving it from a position in the extreme case from a tip of the fluidic structure 2006*a* to a downstream position 2010, covering a radial displacement of 'R'. As such, the ratio of time 'T' to radial displacement 'R' is increased over example of the fluidic structure 1606, 1806 in FIGS. 17 and 18 respectively.

In one aspect of this embodiment, incident fluid 'F' rubs along the pressure side 2004 of the hydrodynamic nosecone 2000, being the drag-based portion of the fluidic structure, causing rotation around a central axis of rotation 'A'. According to another aspect of this invention, this incident fluid 'F' from 2004 then meets additional fluid striking a leading edge 2008 of section 2005, being a lift-based section of the hydrodynamic nosecone 2000 being composed of hydrofoil sections. This additional fluid 'F' from 2004 increases the local flow velocity of 2005 on the pressure side, aiding the hydrodynamic effect by increasing the difference in pressure between the pressure and suction side of 2005, limiting flow separation coming off the trailing edge 2009. Further, the increase in time 'T' that the hydrodynamic nosecone 2000 has to slow down the fluid 'F' and generate power prevents the onset of cavitation known to form in rotating machinery in water, where insufficient time is given by an object to change the velocity of water.

According to another embodiment of this application, the hydrodynamic nosecone 2000, through its curved fluidic elements 2004, 2005, act to gradually harness power from an incoming fluid 'F' flowing against it and improve the efficiency of the associated turbine's blades 2003 in its downstream vicinity, through the concentration of such fluid flow from the center axis of rotation 'A' to further radial positions as described by 'Fi'. In one aspect of this embodiment, the hydrodynamic nosecone 2000 achieves the effect described by 'Fi' by creating an area of high pressure around the hub 2013 and root portion of the blade 2003*a*, and in so doing promote the incoming flow to accelerate radially away 'Fi' from the hub 2013 upstream of the rotor blades 2013 and improve the efficiency of the entire turbine 2001, 2002, 2003 by increasing the axial induction factor and mass flow through the rotor, as described in earlier embodiments.

In another embodiment of this application, incident fluid 'F' would exit off the trailing edge 2009 of the hydrodynamic nosecone 2000 preferentially with laminar characteristics, and enable the improved performance of an associated turbine blade 2003, reducing turbulence and associated vibrations.

FIG. 21 is a side elevation view of a hydrodynamic fluidic structure 2100 adapted to operate in water, according to some embodiments. In this figure, the hydrodynamic fluidic structure 2100 is composed generally curved fluidic elements each composed of a drag-based component 2004 and a lift-based component 2005.

In one embodiment of this application, the hydrodynamic fluidic structure 2100 is the only fluidic component to generate torque about a central axis of rotation 'A' to a main shaft 2013. According to another embodiment of this application, the principle of Time-Dependent Energy Transfer (TDET) is maintained, since the increase in density of the fluid causes an increase in the time 'T' needed to slow down the incident fluid 'F', moving it from a position in the extreme case from a tip of the fluidic structure 2006a to a downstream position 2010, covering a radial displacement of 'R'.

As such, the ratio of time 'T' to radial displacement 'R' is increased over example of the fluidic structure 1606, 1806 in FIGS. 17 and 18 respectively.

In one aspect of this embodiment, incident fluid 'F' rubs along the pressure side 2004 of the hydrodynamic nosecone 2000, being the drag-based portion of the fluidic structure, causing rotation around a central axis of rotation 'A'.

According to another aspect of this invention, this incident fluid 'F' from 2004 then meets additional fluid striking a leading edge 2008 of section 2005, being a lift-based section of the hydrodynamic nosecone 2000 being composed of hydrofoil sections. This additional fluid 'F' from 2004 increases the local flow velocity of 2005 on the pressure side, aiding the hydrodynamic effect by increasing the difference in pressure between the pressure and suction side of 2005, limiting flow separation coming off the trailing edge 2009. Further, the increase in time 'T' that the hydrodynamic nosecone 2000 has to slow down the fluid 'F' and generate power prevents the onset of cavitation known to form in rotating machinery in water, where insufficient time is given by an object to change the velocity of water.

FIG. 22 is a front elevation view of a hydrodynamic fluidic structure 2100 adapted to operate in water, according to some embodiments.

According to an aspect, the hydrodynamic fluidic structure 2100 contains load cells 2015 directly physically associated with at least one of a curved fluidic element containing drag-based elements 2004 and lift-based elements 2005 equidistant in location in the middle of an associated chord width. According to another embodiment of this application, the load cells 2015 transmit a near real-time data feed (e.g., within 0.01-5 seconds) through a data architecture system described in FIG. 24 to reduce unwanted loads and operational phenomena and improve power performance.

During operation, the load cells and associated data stream enable direct control of the hydrodynamic fluidic turbine 2100 based on measured loads by adjusting a turbine's rotating components through a yaw motor. While this is usually at the base of a nacelle, as described in FIG. 16, this can also be done by rotating a ring-generator 2017, as described in FIG. 15. Having a ring-generator 2017 associated with a hydrodynamic fluidic turbine 2100 may be advantageous because a gearbox is not used, thus limiting the number of components and potential sources of vibration and maintenance, an important consideration when turbines are in a marine environment.

In another embodiment of this application, an upstream tip 2006a contains a sensor system 2026 suitable for determining environmental and turbine specific data, coupled to at least one of a condition monitoring system and a supervisory control and data acquisition system, as described in FIG. 25.

In another embodiment of this application, the drag-based elements 2004 of the fluidic structure 2100 contains retention structures 2020 along the leading edge 2008 for inhibiting incident fluid from exiting a respective drag-based element 2004 and for directing the incident fluid toward the lift-based elements 2005, thus improving performance.

FIG. 23 is a perspective view of a hub of a wind turbine for mounting the fluidic structure, according to some embodiments.

During the mounting procedure, the flange 2320 is installed on the hub 2319 by securing to the outer race of the blade bearing 2319a through multiple studs 2319b. These flanges 2320 serve to support the mounting plate 2321, which provides a stable mounting point for the bracket to connect to. Access to this area may involve bypassing the nose cone and spinner assembly (not shown), which generally covers the hub 2319 of a wind turbine.

The flange 2320 may be affixed to the outer race of the blade bearing 2319a either in the factory when the turbine is being assembled, in the field when the turbine is being erected, or at some point after commissioning after the turbine has been in use. Studs 2319b located around 2319a can either be removed and replaced with longer studs to accommodate the flange 2320, or the nut can simply be removed to accommodate the thickness of the flange 2320 before re-tightening, as shown in 2319c.

This flange 2320 allows for a secure hard-point to be established, to affix the fluidic structure 1606 as shown in FIG. 17 to the turbine. When it is desirable to retrofit a fluidic structure onto a turbine that has been operating in the past, it might be necessary to reposition or adjust the fluidic structure 1606 to optimize its aerodynamic performance. This can be done by allowing for multiple points of attachment 2321a, or by allowing for the plate 2321 to be adjusted in the 'Z' direction. It might also be desirable to avoid interference with any circular greasing bottles which may be in place around the blade bearing 2319a, and therefore it would be desirable to cut a hole in the flange as in 2320a to allow for the greasing bottles' passage through it.

Further, when affixing the fluidic structure 1606 as shown in FIG. 17, it might be desirable to adjust the structure rotatable in the azimuth orientation, both for the purpose of affixing it properly to the turbine and to optimize the aerodynamic performance by positioning each fluidic element 1804, 1805 as in FIG. 18 in the correct geometric alignment with a corresponding blade 2303 of the turbine. This should also be allowed for by way of sliding the plate 2321 around the azimuth direction 'A'.

During an installation process where the turbine is erected, the rotor blades 2303 would be locked through a standard procedure known in the art, allowing installation of the flange 2320, of which there may be up to six (6), two (2) between each of the blades 2303, as shown in FIG. 23. These flanges 2320 would protrude through the spinner (not shown) and allow for attachment of the plate 2321 at a level on top of the spinner, and open to the elements. Both elements would be installed ahead of time before the fluidic structure 1606 would be lifted into position with its bracket, saving costly crane time.

FIG. 24 is a side elevation view of a shipping container storing a fluidic structure for transport, according to some embodiments.

In an embodiment of this application, a method of shipping the aerodynamic nosecone 2400 is given, whereby each of the two or more curved fluidic elements 2404 that make up the aerodynamic sections of the aerodynamic nosecone are stacked one atop each other, and fit inside a shipping container 2430 or on the bed of a flatbed truck In addition, the mounting bracket and the flange and plates 2420 are containing within the shipping container 2430 as separate pieces from the curved fluidic elements 2404.

The ability to transport using a standardized shipping container 2430 or on a flatbed truck is novel and beneficial due to the present costs of transporting wind turbine components using over-sized trucking and shipping methods. The modular design of the fluidic structure allows for this to happen, making component stackable.

FIG. 25 is a block schematic diagram of a turbine controller, according to some embodiments.

The turbine controller includes at least one of a data acquisition system, condition monitoring system monitoring other turbine parameters, turbine command and acquisition system, and/or a supervisory control and data acquisition system.

The turbine controller includes anticipatory control mechanisms and defined operating approaches and thresholds that define a cybernetic control methodology and logic that is refreshing control decisions in near real-time or real time (e.g., within 0.01-5 seconds through the above described data architecture system).

A cybernetic control parameter for a turbine is defined, which gives a feed-forward data stream and anticipatory control. The human analogy is that the turbine 'sees' the change in flow behaviour coming, and adjusts to minimizes loads and maximize power production.

Alternate approaches are reactionary, so the turbine is running 'blind', from an anemometer that is on top of the nacelle.

This is problematic as the wind speed that the anemometer reads and the true wind speed are two different aspects, because the rotor wash effects the speeds, and creates turbulence. An adjustment called a 'nacelle transfer function' is used to adjust for this shortfall.

Placing a LiDAR, which uses a laser, to see and track the incoming flow eliminates the problem all together, especially when placed at the center axis, and also when it is a 'continuous wave' LiDAR technology, though both LiDAR technologies are possible. With a pulsed laser, a roller box is necessary, as the LiDAR unit should be stationary in space. The same rules hold true of other environmental fluidic turbines, such as tidal turbines.

LiDAR includes implementations using pulsed laser light where reflected pulses are measured with a sensor. The signals received in response can be analyzed to determine, for example, return times, modified wavelengths (Doppler effect), which can be used, among others, to make determinations based on the detected target, such as a 3-D representation or a detected plane of wind speed measurements of oncoming winds.

These two systems, along with other turbine parameters feed the turbine command and acquisition system, which informs the SCADA system. This system then determines if a change in pitch or yaw is necessary. This system can work with just the load cells, or a combination of the load and feed-forward LiDAR.

In an example, a turbine with a PowerCone™ fitted (e.g., a nosecone of various embodiments described herein), feed-forward LiDAR is installed. The turbine produces nominal power at 8 m/s. The wind speed is 8 m/s, consistent for 10 seconds, measuring every second (1 second data) at a point 100 meters in front of the rotor. During operation, it then 'sees' a gust approaching that rises to 10 m/s. A gust is detected, for example, as a rapid increase in wind velocity (e.g., an acceleration or deceleration beyond a threshold).

Given that the pitch motor in the rotor can pitch the blade at 1 degree per second, and the required change in angle of attack is 1 degrees (from 8 to 10 m/s), the turbine 'counts' 9 seconds before pitching to the correct angle of attack, and meets the gust just in time. This is analogous to 'just in time' delivery. Accordingly, there may be a lag time between pitching the blade and when the gust is detected.

The LiDAR can be set up to 'see' one plane 100 meters out, or varying measurements at 100, 75, 50, 25 meters out, to confirm the measurement first recorded, and adjust as necessary in real time. Given that LiDAR sends out a laser in a cone shape, from its source, the measurements are less precise the closer the measurement is, since the device is not measuring wind speed across the whole rotor. Therefore, a combination of the LiDAR system and additional load cells to the blades of the nosecone (e.g., fluidic elements) to arrive at an advanced control system that uses both sets of data in concert such that the data sets can be used to correct and to adapt for inaccuracies that otherwise impact their effectiveness if used alone.

Contemplate this same turbine is then fitted with load cells on the nosecone blades. The gust comes, and it is measured as a force on the nosecone, which either confirms what the LiDAR detects, or not.

This system can systematically generate control signals to over-ride the LiDAR, since it is a direct measurement, and would give data to compare to the threshold levels in the TCS system. If they are aligned, then the blades would not pitch and the turbine would not yaw. If not, than the SCADA would generate control signals to be issued to the blades and turbine to adjust accordingly (e.g., modify pitch and/or yaw). The load cells on the nosecone can be used in place of an anemometer. Similar principles apply for other fluidic turbines.

FIG. 26 is a block diagram of a computing device, according to some embodiments. The computing device 2600 can include technologies such as a printed circuit board, a set of field programmable gate arrays, a computer server, among others.

As depicted, the computing device includes at least one processor 2602, memory 2604, at least one I/O interface 2606, and at least one network interface 2608.

Processor 2602 may be an Intel or AMD x86 or x64, PowerPC, ARM processor, or the like. Memory 2604 may include a suitable combination of computer memory that is located either internally or externally such as, for example, random-access memory (RAM), read-only memory (ROM), compact disc read-only memory (CDROM), or the like.

Each I/O interface 2606 enables computing device 2600 to interconnect with one or more input devices, such as a keyboard, mouse, camera, touch screen and a microphone, or with one or more output devices such as a display screen and a speaker. The computing device may receive data sets from load cells, LiDAR systems, among others. These data sets may include raw data (e.g., sensory readings at a plane of measurement, or at a point of measurement) or processed data (e.g., wind speed, load amount in terms of stresses or strains).

Each network interface 2608 enables computing device 2600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. The components for communication include pitch/yaw controllers, motors, and servomotors, which may modify various aspects of the turbine rotors, or the fluidic elements and controls thereof to make better use of the incident wind based on an established prediction.

The communication pathways can be utilized to establish feedback/correction loops, for example, providing corrective feedback loops to minimize an error term (e.g., a PI controller, a P controller, a PID controller, among others).

Each controllable degree of freedom can be established as a variable that can be controlled for optimization in an attempt to reduce the error term over a period of time. As a specific example, LiDAR measurements can be used for pitch control, and effectiveness can be measured through the load cells or a detected speed/torque of the blades. Features for optimization include timing aspects (e.g., how much lag time should be implemented between the measurement and the response), how much pitch modification is needed, whether a reading is a sustained gust or is an aberration/noise.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof. Program code can be run on specialized hardware, including special purpose computing devices and processors that are resident on or electronically coupled to the turbine and/or nosecone. The turbine elements and the nosecone elements can be controlled together or separately, in some embodiments. Load cells may be placed on the nosecone fluidic elements or the turbine rotors, or the nacelle, among other locations. Similarly, LiDAR units may reside near or at the nacelle, on rotor blades, or at various other positions and orientations.

FIG. 27 is a side elevation view of a propeller for a ship, according to some embodiments. According to an embodiment of this application the fluidic structure 2706 configured to act as a propeller for a ship 2701 and generate thrust would be attached to the ship's drive shaft 2707 and would have improved geometric features which would allow the fluidic structure to protect itself through the avoidance of the onset of cavitation through the principal of TDET, taking a longer timespan 'T' to accelerate the water, thus creating the required thrust in a more efficient manner, meaning less fuel consumption is needed to achieve the same nautical speed.

The fluidic structure 2706 would accelerate flow starting from a leading edge 2708 towards a trailing edge 2709, creating thrust 'Th'. The geometry of the fluidic structure 2706 is such that the leading edge increases progressively in radius from an upstream end 2706a towards a downstream position 2710, thus providing a propulsive force 'F'. Increasing the blade area has been determined to have a positive effect against vibration, and so the geometry of this fluidic structure 2706 reduces vibration. This reduction in vibration can also have an impact on the reduction of noise. A simplified compensative nozzle is a separate device added to a propeller that reduces oscillations in the inflow by channeling flow into the blades over a greater timespan, thus in part taking advantage of the TDET phenomena. This in turn, reduces the noise levels. Furthermore, in some embodiments, this principle is incorporated in an ordered combination into one device that accentuated the phenomena by having the aspects operate in concert.

According to another embodiment of this application, a method for operating a ship with a propeller like that described in FIG. 27 is given.

Drag and in-flow conditions have a direct impact on the performance. Due to the fact that the water flow coming into a propeller's disk area behind a hull is neither constant or at right-angles, a slight rotation results from the act of a spinning propeller. During operation, this rotation aids in the relative rotative efficiency by 'pre-conditioning' the flow to accelerate along aligned trajectories, thereby limiting turbulence and associated drive shaft vibration, and promoting laminar flow. During operation, the geometry of the fluidic structure 2706 promotes laminar flow by both pre-conditioning the flow in the region at and upstream of the upstream end 2706a and by aligning its exit along linear trajectories in areas towards and beyond the downstream position 2710.

Wind turbine nose cone assembly configurations described herein are expected to improve the operational efficiency of wind turbines by harnessing more of the available kinetic energy in front of the plane of the rotor blade(s), especially around the hub region and/or increase the available kinetic energy of the wind to the rotor blade(s) and/or ventilate the hub and surrounding area and/or reduce the operational noise emissions of the nose cone and/or provide a quick attachment method for the nose cone assembly and/or reduce wind turbine operational costs.

The above-described configurations to the nose cone of a horizontal-axis wind turbine can also be applied to other devices that extract power from a moving fluid, such as vertical-axis wind turbines, and both of any scale. Such improvements may apply equally well, mutatis mutandis, with such mutations as being relevant, including but not limited to, high altitude wind power (HAWP) devices, kite wind turbines, energy kites, tidal turbines, urban wind turbines, and other things. The improvements described herein may be applied to wind turbines having fewer or more blades than described by way of example in order to increase the operational efficiency of a wind turbine, to decrease maintenance costs and mechanical wear, and to increase the scalability and marketability of such wind turbines.

This improvements may also be applied equally well, mutatis mutandis, with such mutations as being relevant, to structures that are required to put power into a flow. Notable examples include propellers and/or thrusters for airplanes, boats, gliders and drones, intake fans for jet engines, water pumps, air fans and other things. In particular, FIG. 27 is a propeller for a ship.

Some embodiments may have been described with reference to method type claims whereas other embodiments may have been described with reference to apparatus type claims. However, a person skilled in the art will gather from the above and the following description that, unless otherwise notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment.

Other aspects may become apparent to the skilled reader upon review of the following.

Although embodiments have been described with reference to the drawings, those of skill in the art will appreciate that variations and modifications may be made without departing from the spirit and scope thereof as defined by the appended claims.

It should be noted that the term 'comprising' does not exclude other elements or steps and the use of articles "a" or "an" does not exclude a plurality. Also, elements described in association with different embodiments may be combined. It should be noted that reference signs in the claims should not be construed as limiting the scope of the claims.

Although embodiments have been described with reference to the drawings, those of skill in the art will appreciate that variations and modifications may be made without departing from the spirit, scope and purpose of the invention as defined by the appended claims.

For example, alternative construction of fluidic devices and associated mounting brackets could employ a "space-frame" design with metal latticework wrapped in a polyester weave coat. Alternatively, the design could employ a voronoi pattern.

While the description above has been primarily with regard to fluidic structures for horizontal-axis wind turbines, the structures described may be applicable to other devices, such as vertical-axis wind turbines, tidal turbines, hydroelectric dam turbines, kite turbines, high altitude wind power (HAWP) devices, kite wind turbines, energy kites and urban wind turbines. All of these devices could be improved with a fluidic device such as described herein, within the need for attached rotor blades. For example, the nosecone can be placed within a circular structure to rotate. In particular, FIG. 15 is a front elevation view of an urban wind turbine incorporating a fluidic structure in such a manner.

All of the devices mentioned use the same device with variations in size.

Propellers for aircraft (such as a glider, civilian airplane, drone or jet engine caps), watercraft, spacecraft, turbochargers and the like could employ the above-described fluidic structure, except that power would be used in the spinning of this device, and thus it would be spun the opposite direction, to induce flow of the fluid towards the back of the structure. The spiralling would have a direction beneficial to such a configuration.

In accordance with another aspect, an ultrasonic noise inducer for the purpose of repelling any animal of flight from a horizontal or a vertical-axis wind turbine may be integrated with a fluidic structure such as is described herein, or into a standard paraboloidal nose cone or other structure. To the knowledge of the present inventor, no satisfactory solution exists to discourage or prevent flying animals of any sort from coming into contact with rotor blades or any other part of a wind turbine, that uses ultrasonic sound waves, so as to reduce or prevent animal death and damage to the wind turbine.

According to a first aspect, an ultrasonic noise inducer of 15 KHz or greater with a sound pressure at 1 meter of 95-102 dB is fitted inside the nose cone or the nacelle unit, or any other area which does not affect the aerodynamic properties of the horizontal-axis wind turbine for the purpose of repelling animals of flight from striking a horizontal-axis or vertical-axis wind turbine, wherein the ultrasonic noise inducer is placed in any vicinity around or in the wind turbine such that the desired effect of repelling the animals of flight can be achieved and the aerodynamic properties of the wind turbine are not affected, wherein the installation of the ultrasonic noise inducer occurs during or after the installation of the horizontal-axis wind turbine, wherein the power for the ultrasonic noise inducer comes from the wind turbine itself, or an external source.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A fluidic turbine comprising:
   a hub that rotates about a center axis of rotation, aligned to a main shaft; and
   a fluidic structure configured to be mounted onto the hub of a primary turbine that contributes torque to the main shaft through increasing at least one of lift and drag,
   wherein the fluidic structure includes two or more curved fluidic elements that extend from an upstream tip that aligns to the center axis of rotation, to a downstream end at a radial position away from the center axis, and rotates about the center axis to contribute torque to the primary turbine; and,
   wherein the two or more curved fluidic elements contain chord sections that are wider at an upstream position relative to a downstream position;
   wherein the upstream tip of the fluidic structure contains a sensor and and associated data system for determining environmental and turbine conditions, wherein data from the sensor and the sensor computing device is transmitted to a supervisory control and data acquisition system of the primary turbine.

2. The fluidic turbine of claim 1, wherein the curved fluidic elements contain associated load cells;
   and the load cells generate load data associated with the curved fluidic elements, and wherein the supervisory control and data acquisition system is configured to correct and to adapt for inaccuracies in the environmental and turbine specific data based on the load data.

3. The fluidic turbine of claim 1, wherein the fluidic structure is configured to attach to the hub using an adjustable system of brackets and hard-points that allow for changes along a plane of the center axis of rotation and in azimuth positions.

4. The fluidic turbine of claim 1, wherein the fluidic turbine is a horizontal-axis wind turbine and the fluidic structure is the only aerodynamic structure providing torque to the main shaft.

5. The fluidic turbine of claim 1, wherein the fluidic turbine is a horizontal-axis wind turbine with a rotor mounted to the hub at a root portion with a plurality of blades, the root portion defining a rotor plane, each blade of the plurality of blades having a leading edge, a trailing edge, a pressure side, a suction side and having aerofoil sections adapted to extract energy from wind through lift and provide torque to the main shaft; wherein the fluidic structure is an aerodynamic nosecone having two or more curved fluidic elements that meet at the upstream tip, where the upstream tip is upstream from the rotor plane.

6. The fluidic turbine of claim 5, wherein the aerodynamic nosecone includes the curved fluidic elements that are adapted to gradually harness power from an incoming airflow and improve the efficiency of the primary turbine in a proximate vicinity to the fluidic turbine through concentration of such airflow from the center axis of rotation to a further radial position and, the curved fluidic elements adapted to guide said airflow onto the suction side of the blade, reducing flow separation, turbulence and associated vibrations.

7. The fluidic turbine of claim 5, wherein the aerodynamic nosecone includes the curved fluidic elements and is adapted to create an area of useful high pressure around the hub and root portion of the rotor, promoting incoming airflow to accelerate radially away from the hub upstream of the rotor and improving the efficiency of the primary turbine by increasing the an axial induction factor and mass flow through the rotor.

8. The fluidic turbine of claim 1, wherein the fluidic turbine is a at least one of horizontal-axis tidal turbine, hydroelectric dam turbine, a kite turbine, a high altitude wind power (HAWP) device, or a kite wind turbine, and the fluidic structure is the only fluid-dynamic structure providing torque to the main shaft.

9. The fluidic turbine of claim 1, wherein the fluidic turbine is at least one of a vertical-axis tidal turbine, hydroelectric dam turbine, a kite turbine, a high altitude wind power (HAWP) device, or a kite wind turbine, and the fluidic structure is the only fluid-dynamic structure providing torque to the main shaft.

10. The fluidic turbine of claim 1, wherein the fluidic turbine is a horizontal-axis tidal turbine, with a rotor mounted to the hub at a root portion with a plurality of blades, the root portion defining a rotor plane, each blade of the plurality of blades having a leading edge, a trailing edge, a pressure side, a suction side and substantially having hydrofoil sections designed to extract energy from water and provide torque to the main shaft, wherein the fluidic structure is a hydrodynamic nosecone with the upstream tip upstream from the rotor plane and a further radial position downstream from the rotor plane.

11. The fluidic turbine of claim 10, wherein the curved fluidic elements act to gradually harness power from an incoming water flow and improve the efficiency of the fluidic turbine in a downstream vicinity through concentration of such water flow from a center axis of rotation to a further radial position and guide said water flow onto the suction side of the blade, reducing flow separation, cavitation, turbulence and associated vibrations.

12. The fluidic turbine of claim 10, wherein the curved fluidic elements act to create an area of high pressure around the hub and root portion of the rotor, causing the incoming water flow to accelerate radially away from the hub upstream of the rotor, improving the efficiency of the entire turbine by increasing an axial induction factor and mass flow through the rotor.

13. The fluidic turbine of claim 1, further comprising an ultra-sonic noise inducer at the upstream tip specifically programmed to deter bats and other avian species from flying near the fluidic turbine by producing a noise that is not audible to humans.

14. The fluidic turbine of claim 1, whereby the fluidic structure is integrated with, or fitted and attached to, the hub of the fluidic turbine in a central position in-line with the center axis of rotation to replace an existing nosecone either while the fluidic turbine is installed in an operational environment of the primary turbine or in a factory setting as part of fabrication of the primary turbine.

15. The fluidic turbine of claim 1, wherein the two or more curved fluidic elements are each adapted to direct incident wind outwards in a direction substantially normal to the center axis of rotation along a suction side of a corresponding rotor blade of the primary turbine.

16. The fluidic turbine of claim 1, wherein a direction in which the fluidic elements are curved with respect to the center axis of rotation corresponds with an opposite direction of a rotational direction of a drive shaft and rotor blades of the primary turbine.

17. The fluidic turbine of claim 16, wherein the fluidic elements are curved to have a curve that is based on maximizing a radial alignment with a corresponding rotor blade.

18. A method of operating a fluidic turbine, wherein a sensor system is configured to determine environmental and turbine specific data, and includes at least one of a forward facing LiDAR sensor coupled to a tip of a fluidic structure that provides a feed-forward data stream of LiDAR information to reduce unwanted loads and operational phenomena on a primary turbine's rotating components and supporting structure, while improving the power performance through anticipatory control procedures and defined operating approaches and thresholds, wherein;
 a pitchable rotor blade is controllable to set a desired angle of attack,
 rotating components of the primary turbine or the fluidic structure are controllable to be yawed to one or more desired orientations;
 the method comprising:
 detecting, at a first detection plane spaced away from the fluidic turbine, a feed-forward data stream of LiDAR readings representing wind speed characteristics at the first detection plane;
 processing the feed-forward data stream in a supervisory control and data acquisition system configured to generate a series of mechanical control command signals responsive to the wind speed characteristic readings, the series of mechanical control command signals modifying at least the desired angle of attack and the one or more desired orientations of the rotating components;
 wherein the supervisory control and data acquisition system is configured to refresh control decisions in real or near real-time;
 detecting, at one or more load cells physically coupled to one or more curved fluidic elements of the fluidic structure, a strain level indicative of a load factor on the one or more curved fluidic elements to be stored in a data storage as one or more load factor data sets;
 processing, by the supervisory control and data acquisition system, the one or more load factor data sets to establish an error metric between the series of mechanical control command signals and the wind speed characteristics; and
 updating, by the supervisory control and data acquisition system, one or more control characteristics of the supervisory control and data acquisition computing device to reduce the error metric, the one or more control characteristics including at least a compensatory lag time between a time when the series of mechanical control command signals are utilized to modify the at least the desired angle of attack and the one or more desired orientations of the rotating components and a time when the wind speed characteristics are measured.

* * * * *